US011401899B2

(12) United States Patent
Gorai et al.

(10) Patent No.: US 11,401,899 B2
(45) Date of Patent: Aug. 2, 2022

(54) PHYSICAL QUANTITY DETECTION DEVICE

(71) Applicant: Hitachi Astemo, Ltd., Hitachinaka (JP)

(72) Inventors: Nobuaki Gorai, Hitachinaka (JP);
Takahiro Miki, Hitachinaka (JP);
Akira Uenodan, Hitachinaka (JP);
Naoki Saito, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/414,738

(22) PCT Filed: Feb. 7, 2020

(86) PCT No.: PCT/JP2020/004732
§ 371 (c)(1),
(2) Date: Jun. 16, 2021

(87) PCT Pub. No.: WO2020/202791
PCT Pub. Date: Oct. 8, 2020

(65) Prior Publication Data
US 2022/0074375 A1 Mar. 10, 2022

(30) Foreign Application Priority Data
Mar. 29, 2019 (JP) .............................. JP2019-068414

(51) Int. Cl.
*F02M 35/10* (2006.01)
*G01F 1/684* (2006.01)
*G01F 1/688* (2006.01)

(52) U.S. Cl.
CPC .. *F02M 35/10386* (2013.01); *F02M 35/1038* (2013.01); *G01F 1/688* (2013.01); *G01F 1/6842* (2013.01)

(58) Field of Classification Search
CPC .......... F02M 35/10386; F02M 35/1038; G01F 1/6842; G01F 1/688; G01F 1/692;
(Continued)

(56) References Cited

U.S. PATENT DOCUMENTS 10,190,898 B2 * 1/2019 Miki ...................... G01F 1/6842
11,079,262 B2 * 8/2021 Watanabe ........ F02M 35/10393
(Continued)

FOREIGN PATENT DOCUMENTS

JP 2015-87254 A 5/2015
JP 6198955 B2 9/2017

OTHER PUBLICATIONS

International Search Report (PCT/ISA/210) issued in PCT Application No. PCT/JP2020/004732 dated Mar. 24, 2020 with English translation (four (4) pages).
(Continued)

*Primary Examiner* — Freddie Kirkland, III
(74) *Attorney, Agent, or Firm* — Crowell & Moring LLP

(57) ABSTRACT

To obtain a physical quantity detection device capable of reducing an intake amount of air accompanied by foreign matter. A physical quantity detection device (20) of the invention includes a housing arranged in a main passage through which a measurement target gas (2) flows. The housing is provided with a second sub-passage (B) that takes in a part of the measurement target gas (2) flowing in the main passage, a circuit chamber (135) that accommodates a pressure sensor (320) that detects a pressure of the measurement target gas (2), and a pressure introduction passage (170) having one end opened in the middle of the second sub-passage (B) and the other end opened in the circuit chamber (135) and capable of introducing the pressure of the measurement target gas (2) from the second sub-passage (B) into the circuit chamber (135). In the pressure introduction
(Continued)

passage (170), an introduction port (171) is arranged at a position offset outward from a side wall surface (152*b*) of the second sub-passage (B).

7 Claims, 27 Drawing Sheets

(58) Field of Classification Search
CPC .......... G01F 5/00; G01F 15/04; G01K 13/02; G01L 19/00; G01N 27/00
See application file for complete search history.

(56) References Cited

U.S. PATENT DOCUMENTS

| 2015/0114098 A1 | 4/2015 | Kamiya |
| 2017/0248455 A1 | 8/2017 | Miki et al. |

OTHER PUBLICATIONS

Japanese-language Written Opinion (PCT/ISA/237) issued in PCT Application No. PCT/JP2020/004732 dated Mar. 24, 2020 (three (3) pages).

\* cited by examiner

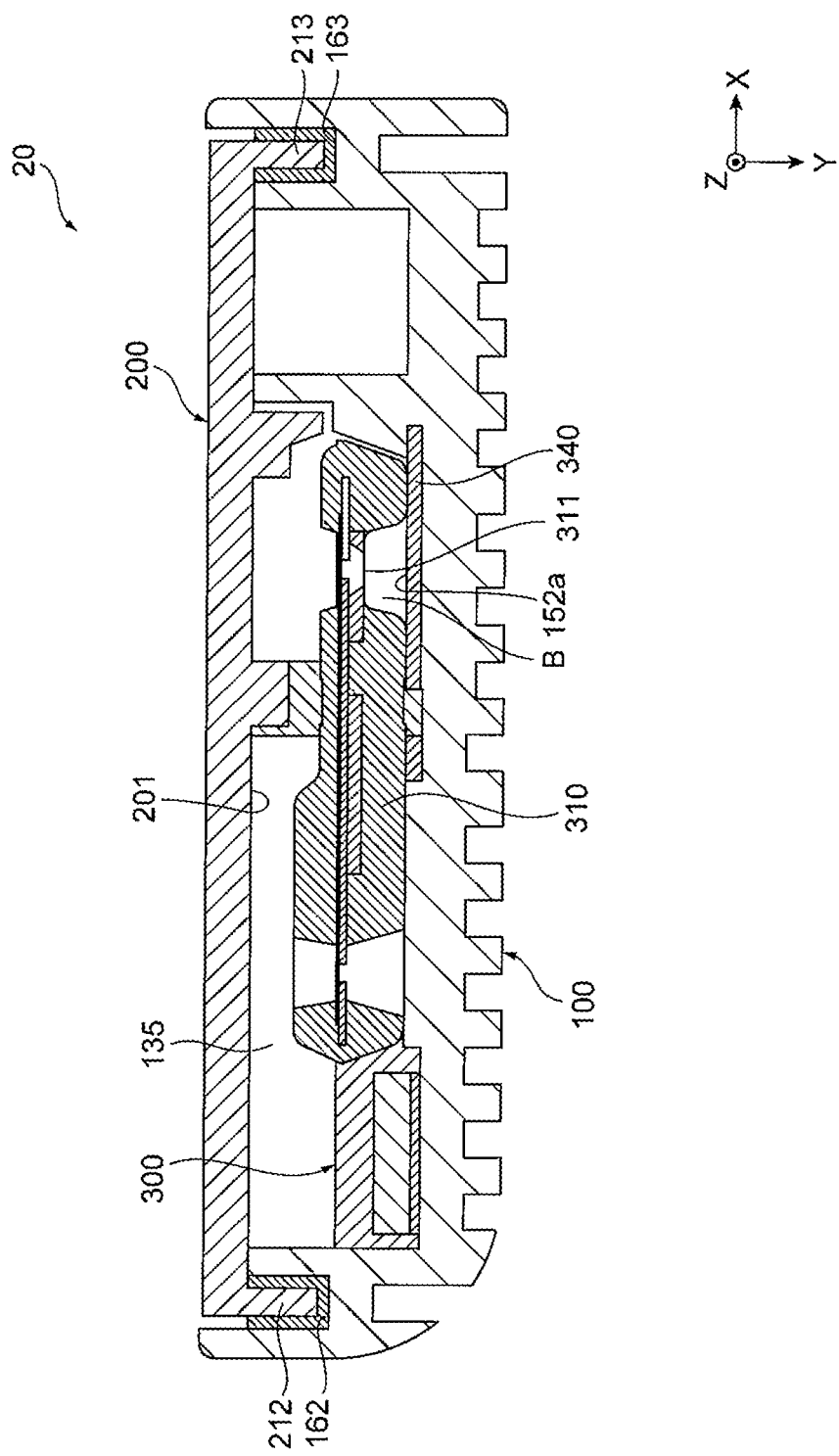

PHYSICAL QUANTITY DETECTION DEVICE

TECHNICAL FIELD

The present invention relates to a physical quantity detection device that detects a physical quantity of intake air of an internal combustion engine, for example.

BACKGROUND ART

PTL 1 discloses a structure of an air flow rate measurement device in which a bypass flow path that takes in a part of air flowing through a main flow path formed in a duct and a sub-bypass flow path that branches from the bypass flow path and takes in a part of air flowing through the bypass flow path are formed inside, and a sensor is installed in the sub-bypass flow path.

CITATION LIST

Patent Literature

PTL 1: JP 2015-87254 A

SUMMARY OF INVENTION

Technical Problem

According to the configuration of PTL 1, when air accompanied by foreign matter is taken into the sub-bypass flow path from the bypass flow path, the foreign matter may adhere to the sensor to contaminate the sensor.

The invention has been made in view of the above points, and an object of the invention is to provide a physical quantity detection device capable of reducing an intake amount of air accompanied by foreign matter.

Solution to Problem

A physical quantity detection device of the invention that solves the above problem includes a housing arranged in a main passage through which a measurement target gas flows. The housing is provided with a sub-passage that takes in a part of the measurement target gas flowing through the main passage, a sensor chamber that accommodates a pressure sensor that detects a pressure of the measurement target gas, and a pressure introduction passage that has one end opened in the middle of the sub-passage and the other end opened in the sensor chamber and is capable of introducing the pressure of the measurement target gas from the sub-passage to the sensor chamber. The pressure introduction passage has an introduction port arranged at a position offset outward from a side wall surface of the sub-passage.

Advantageous Effects of Invention

According to the invention, in the pressure introduction passage, since the introduction port is arranged at a position offset outward from the side wall surface of the sub-passage, a separation flow can be formed between the side wall surface and the introduction port. This separation flow makes it possible to bring the surrounding environment of the introduction port into a negative pressure state and to make it difficult to be affected by the dynamic pressure of the fluid passing through the sub-passage. Therefore, for example, it is possible to prevent water contained in the measurement target gas from flowing into the introduction port and blocking the introduction passage, and stable sensing can be performed by the pressure sensor of the sensor chamber.

Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 2H is a cross-sectional view taken along line IIH-IIH in FIG. 2A.

DESCRIPTION OF EMBODIMENTS

Figure 1:
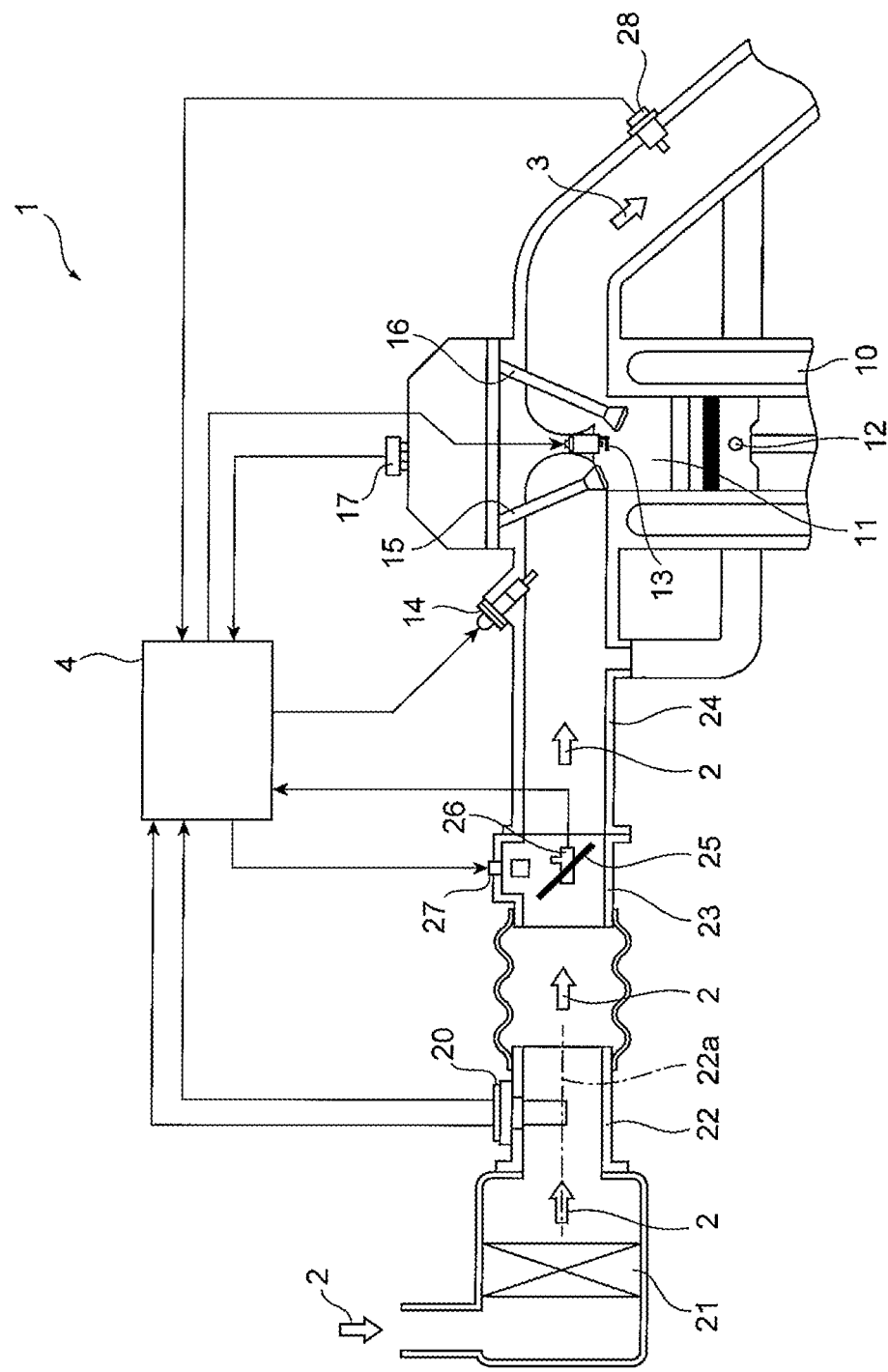
FIG. 1 is a system diagram illustrating an embodiment in which a physical quantity detection device according to the invention is used in an internal combustion engine control system.

A mode for carrying out the invention (embodiment) described below solves various problems desired as an actual product, and solves various problems desirable for use as a detection device that detects a physical quantity of intake air of a vehicle in particular, and exhibits various effects. One of the various problems solved by the following embodiments is the content described in the section of the problem to be solved by the invention described above, and one of the various effects achieved by the following embodiments is the effect described in the section of the effect of the invention. Various problems solved by the following embodiments and various effects achieved by the following embodiments will be described in the following description of the embodiments. Therefore, the problems and effects solved by the examples described in the following examples are also described in contents other than the contents in the section of the problem to be solved by the invention and the section of the effect of the invention.

In the following embodiments, the same reference numerals indicate the same configuration even if the figure numbers are different, and the same functions and effects are obtained. For the already described configuration, only reference numerals are given to the drawings, and description thereof may be omitted.

FIG. 1 is a system diagram illustrating an embodiment in which a physical quantity detection device according to the invention is used in an internal combustion engine control system 1 of an electronic fuel injection type. On the basis of the operation of an internal combustion engine 10 which includes an engine cylinder 11 and an engine piston 12, an intake air is sucked from an air cleaner 21 as a measurement target gas 2, and guided to a combustion chamber of the engine cylinder 11 through an intake body that is a main passage 22, a throttle body 23, and an intake manifold 24. The physical quantity of the measurement target gas 2, which is the intake air guided to the combustion chamber, is detected by the physical quantity detection device 20 according to the invention, fuel is supplied from the fuel injection valve 14 based on the detected physical quantity, and guided to the combustion chamber in an air-fuel mixture state together with the measurement target gas 2. Further, in this embodiment, the fuel injection valve 14 is provided with an intake port of the internal combustion engine. The fuel injected to the intake port forms an air-fuel mixture together with the measurement target gas 2, guided to the combustion chamber via an intake valve 15, and combusted to generate mechanical energy.

The fuel and the air guided to the combustion chamber are in a state where the fuel and the air are mixed. The air-fuel mixture is explosively combusted by spark ignition of an ignition plug 13 to generate mechanical energy. The gas after explosion is guided from an exhaust valve 16 to an exhaust pipe, and discharged as an exhaust gas 3 from the exhaust pipe to the outside of the vehicle. The flow rate of the measurement target gas 2, which is the intake air, guided to the combustion chamber is controlled by a throttle valve 25 of which the opening is changed on the basis of an operation of an accelerator pedal. The fuel supply amount is controlled on the basis of the flow rate of the intake air guided to the combustion chamber. An operator controls the flow rate of the intake air guided to the combustion chamber by controlling the opening of the throttle valve 25, so that the mechanical energy generated by the internal combustion engine can be controlled.

Physical quantities such as a flow rate, temperature, humidity, and pressure of the measurement target gas 2, which is the intake air taken in from the air cleaner 21 and flowing through the main passage 22, are detected by a physical quantity detection device 20, and an electric signal representing the physical quantity of the intake air is input from the physical quantity detection device 20 to a control device 4. In addition, the output of a throttle angle sensor 26 which measures the opening of the throttle valve 25 is input to the control device 4. Further, the output of a rotational angle sensor 17 is input to the control device 4 to measure the positions and states of the engine piston 12 of the internal combustion engine, the intake valve 15, and the exhaust valve 16, and a rotation speed of the internal combustion engine. The output of an oxygen sensor 28 is input to the control device 4 to measure a state of a mixture ratio between the fuel amount and the air amount of the exhaust gas 3.

The control device 4 calculates the fuel injection amount and the ignition timing based on the physical quantity of the intake air which is the output of the physical quantity detection device 20 and the rotational speed of the internal combustion engine measured based on the output of the rotational angle sensor 17. On the basis of these calculation results, the fuel amount supplied from the fuel injection valve 14 and the ignition timing of the ignition plug 13 are controlled. The fuel supply amount and the ignition timing are actually controlled finely on the basis of a change state of the temperature and throttle angle detected by the physical quantity detection device 20, a change state of the engine rotation speed, and a state of the air-fuel ratio measured by the oxygen sensor 28. The control device 4 controls an air amount bypassing the throttle valve 25 using an idle air control valve 27 in an idle operation state of the internal combustion engine, and controls the rotation speed of the internal combustion engine in the idle operation state.

The fuel supply amount and the ignition timing which are main control amounts of the internal combustion engine both are calculated using the output of the physical quantity detection device 20 as a main parameter. Therefore, the improvement in detection accuracy of the physical quantity detection device 20, the suppression from change with time, and the improvement in reliability are important to improve the control accuracy and to secure the reliability of the vehicle.

Particularly, in recent years, a desire for saving fuel of the vehicle is extremely increased, and a desire for cleaning the exhaust gas is extremely increased. In order to meet these demands, it is extremely important to improve the detection accuracy of the physical quantity of the intake air detected by the physical quantity detection device 20. It is also important that the physical quantity detection device 20 maintains high reliability.

The vehicle on which the physical quantity detection device 20 is mounted is used in an environment where changes in temperature and humidity are large. It is desirable that the physical quantity detection device 20 consider a response to a change in temperature or humidity in the use environment and a response to dust, contaminants, and the like.

The physical quantity detection device 20 is mounted on an intake pipe affected by heat generated from the internal combustion engine. Therefore, heat generated by the internal combustion engine is transmitted to the physical quantity detection device 20 via the intake pipe. Since the physical quantity detection device 20 detects the flow rate of the measurement target gas by performing heat transfer with the measurement target gas, it is important to suppress the influence of heat from the outside as much as possible.

As described below, the physical quantity detection device 20 mounted on the vehicle not only simply solves the problem described in the section of the problem to be solved by the invention and exerts the effect described in the section of the effect of the invention, but also solves various problems required as a product in sufficient consideration of the various problems described above and exerts various effects. Specific problems to be solved and specific effects to be obtained by the physical quantity detection device 20 will be described in the following description of embodiments.

First Embodiment

FIGS. 2A to 2F are diagrams illustrating an appearance of the physical quantity detection device. In the following description, it is assumed that the measurement target gas flows along the central axis of the main passage.

The physical quantity detection device 20 is used in a state of being inserted into the main passage 22 from a mounting hole provided in a passage wall of the main passage 22 and fixed to the main passage 22. The physical quantity detection device 20 includes a housing arranged in the main passage 22 through which the measurement target gas flows. The housing of the physical quantity detection device 20 includes a housing 100 and a cover 200 attached to the housing 100.

The housing 100 is formed by injection molding a synthetic resin material, for example. The cover 200 is formed of, for example, a plate-like member made of a metal material or a synthetic resin material, and is formed of an aluminum alloy or an injection-molded article made of a synthetic resin material in this embodiment.

The housing 100 includes a flange 111 for fixing the physical quantity detection device 20 to the intake body that is the main passage 22, a connector 112 that protrudes from the flange 111 and is exposed to the outside from the intake body for electrical connection with an external device, and a measurement unit 113 that extends from the flange 111 so as to protrude toward the center of the main passage 22.

The measurement unit 113 has a thin and long shape extending straight from the flange 111, and includes a wide front surface 121, a back surface 122, and a pair of narrow side surfaces 123 and 124. The measurement unit 113 protrudes from the inner wall of the main passage 22 toward the passage center of the main passage 22 in a state where the physical quantity detection device 20 is attached to the main passage 22. Then, the front surface 121 and the back surface 122 are arranged in parallel along the central axis of the main passage 22. Among the narrow side surfaces 123 and 124 of the measurement unit 113, the side surface 123 on one side in the longitudinal direction of the measurement unit 113 is arranged to face the upstream side of the main passage 22, and the side surface 124 on the other side in the lateral direction of the measurement unit 113 is arranged to face the downstream side of the main passage 22. In a state where the physical quantity detection device 20 is attached to the main passage 22, the distal end portion of the measurement unit 113 is defined as a lower surface 125.

In the measurement unit 113, a sub-passage inlet 131 is provided on the side surface 123, and a first outlet 132 and a second outlet 133 are provided on the side surface 124. The sub-passage inlet 131, the first outlet 132, and the second outlet 133 are provided at the distal end portion of the measurement unit 113 extending from the flange 111 toward the center direction of the main passage 22. Therefore, the gas in the portion close to the central portion away from the inner wall surface of the main passage 22 can be taken into the sub-passage. Therefore, the physical quantity detection device 20 can measure the flow rate of the gas in the portion away from the inner wall surface of the main passage 22, and can suppress a decrease in measurement accuracy due to the influence of heat or the like.

Figure 2A:
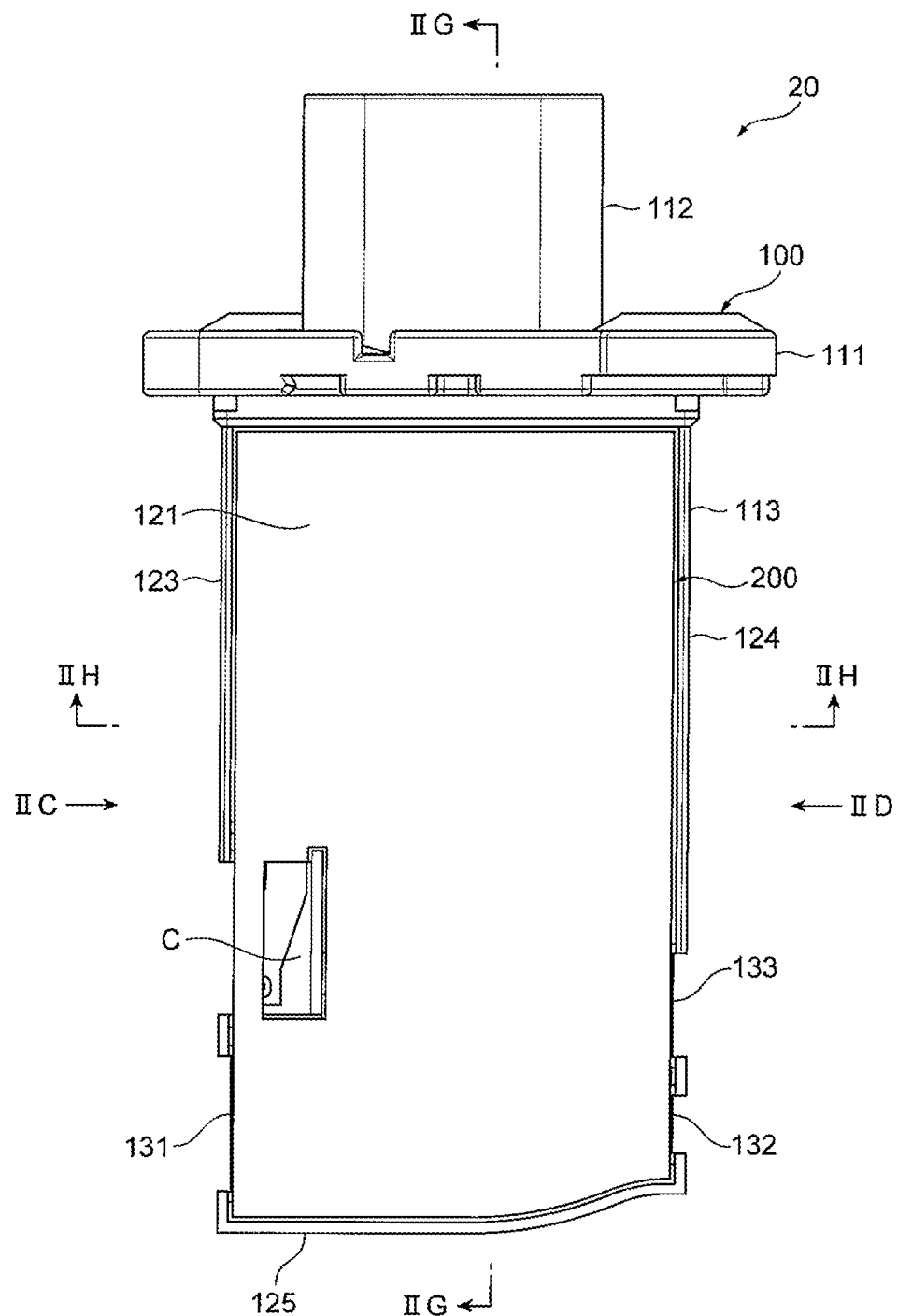
FIG. 2A is a front view of the physical quantity detection device.
Figure 2B:
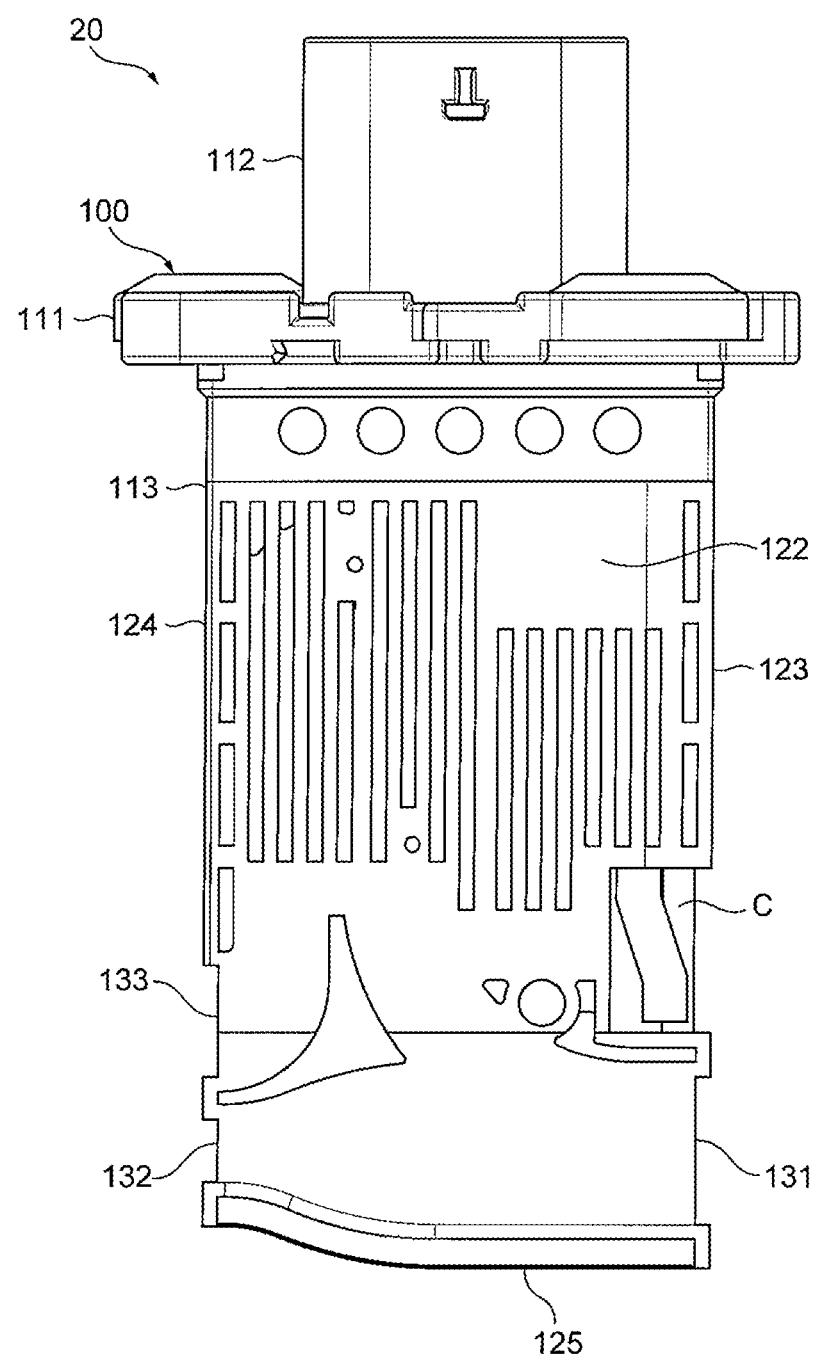
FIG. 2B is a rear view of the physical quantity detection device.
Figure 2C:
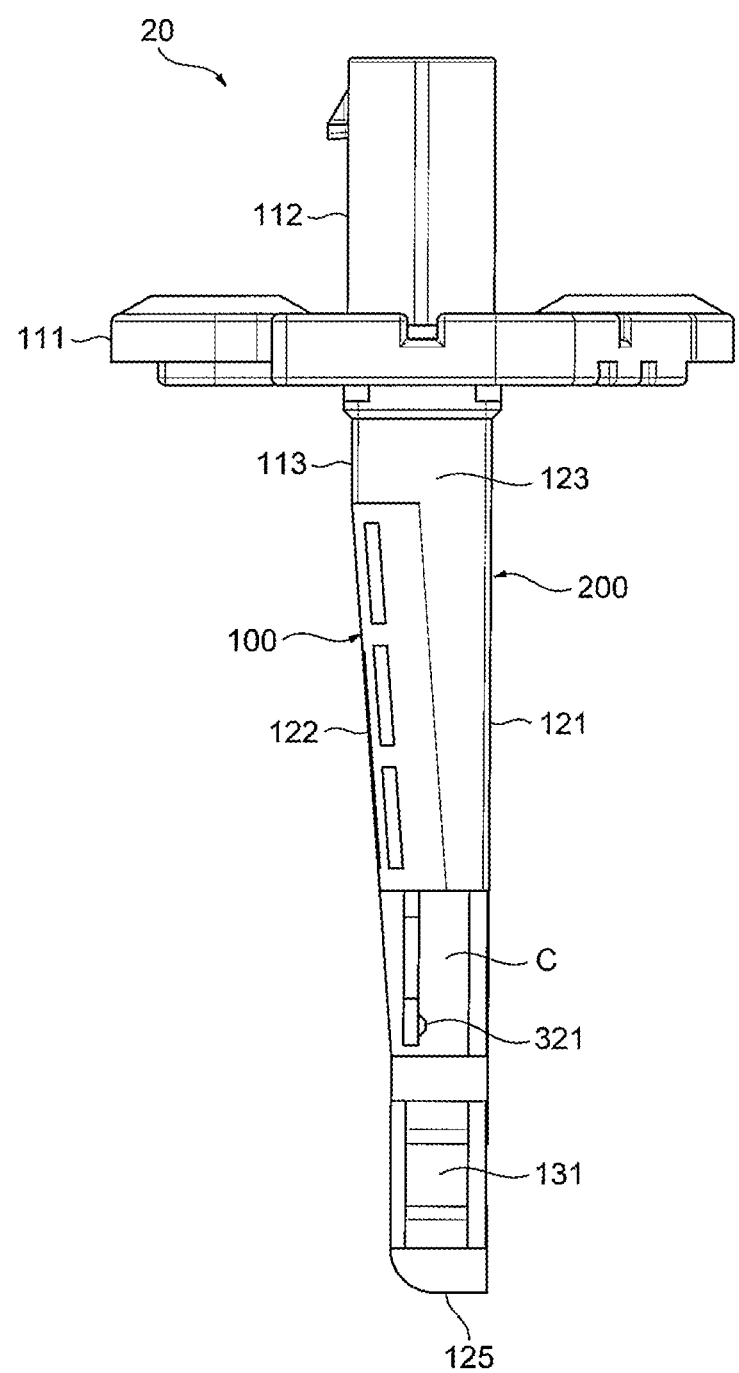
FIG. 2C is a diagram viewed in a direction of arrow IIC in FIG. 2A.
Figure 2D:
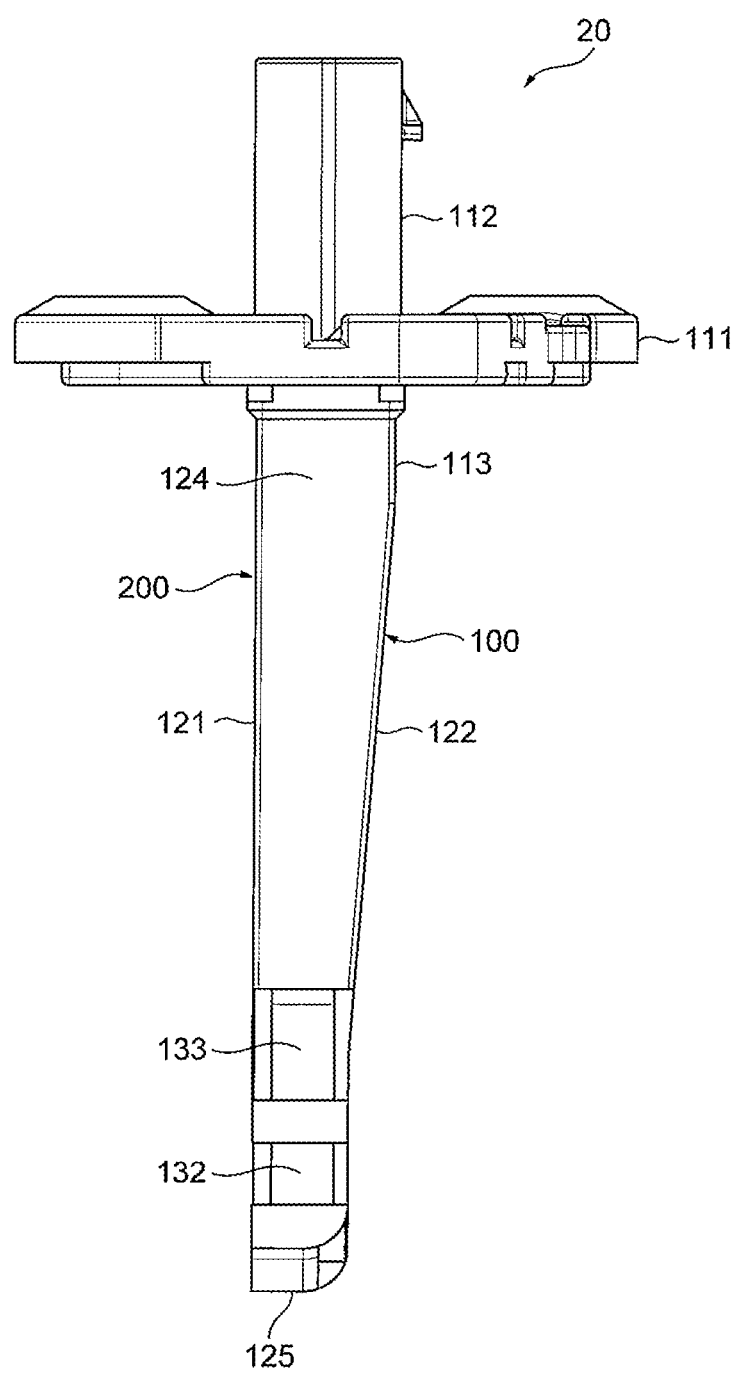
FIG. 2D is a diagram viewed in a direction of arrow IID in FIG. 2A.

The physical quantity detection device 20 has a shape in which the measurement unit 113 extends long along the axis from the outer wall of the main passage 22 toward the center, but the widths of the side surfaces 123 and 124 are narrow as illustrated in FIGS. 2B and 2D. As a result, the physical quantity detection device 20 can suppress the fluid resistance to a small value with respect to the measurement target gas 2.

As illustrated in FIG. 2B, in the physical quantity detection device 20, an intake air temperature sensor 321 and a humidity sensor 322, which are temperature detection units, are provided in the measurement unit 113. The intake air temperature sensor 321 is arranged in the middle of the passage of a temperature detection passage C having one end opened in the vicinity of the sub-passage inlet 131 of the side surface 123 and the other end opened to both the front surface 121 and the back surface 122 of the measurement unit 113.

According to the physical quantity detection device 20 of this embodiment, since the intake air temperature sensor 321 is arranged on the upstream side of the measurement unit 113, the measurement target gas 2 flowing straight from the upstream can be directly applied to the intake air temperature sensor 321. Therefore, the heat dissipation of the intake air temperature sensor 321 can be improved.

Figure 2E:
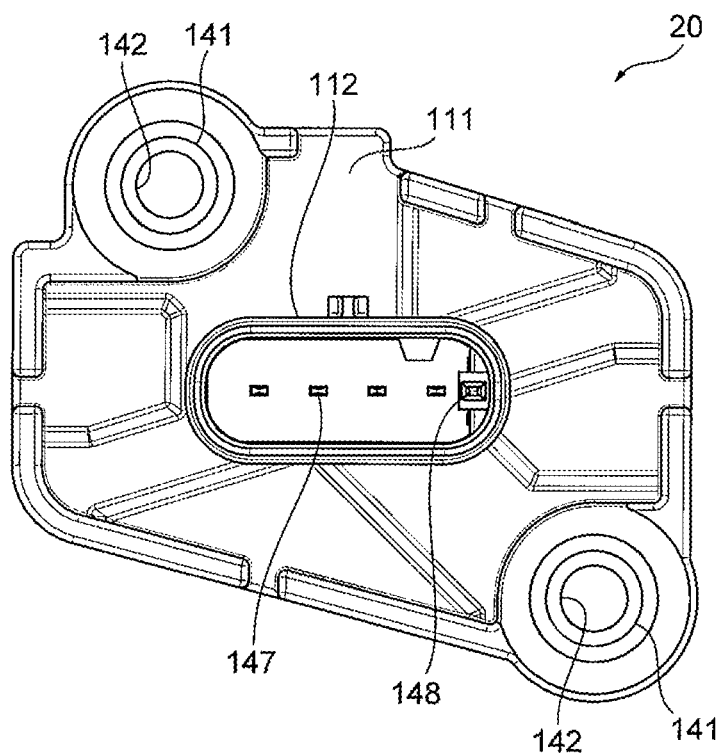
FIG. 2E is a plan view of the physical quantity detection device.
Figure 2F:
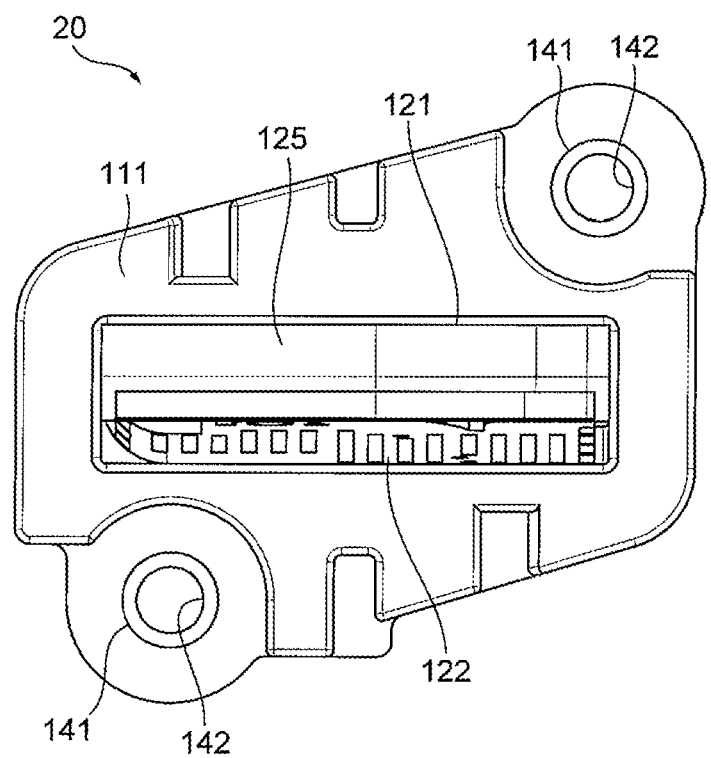
FIG. 2F is a bottom view of the physical quantity detection device.

The measurement unit 113 of the physical quantity detection device 20 is inserted into the inside from a mounting hole provided in the main passage 22, and the flange 111 of the physical quantity detection device 20 abuts on the main passage 22 and is fixed to the main passage 22 with a screw. The flange 111 has a substantially rectangular shape in plan view having a predetermined plate thickness, and as illustrated in FIGS. 2E and 2F, fixing hole portions 141 are provided in pairs at diagonal corners. The fixing hole portion 141 has a through hole 142 penetrating the flange 111. The flange 111 is fixed to the main passage 22 by inserting a fixing screw (not illustrated) into the through hole 142 of the fixing hole portion 141 and screwing the fixing screw into a screw hole of the main passage 22.

As illustrated in FIG. 2E, four external terminals 147 and a correction terminal 148 are provided inside the connector 112. The external terminal 147 is a terminal for outputting a physical quantity such as a flow rate or a temperature which is a measurement result of the physical quantity detection device 20 and a power source terminal for supplying DC power for operating the physical quantity detection device 20.

The correction terminal 148 is a terminal used to measure the produced physical quantity detection device 20, obtain the correction value related to each physical quantity detection device 20, and store the correction value in the memory inside the physical quantity detection device 20. In the subsequent measurement operation of the physical quantity detection device 20, the correction data representing the correction value stored in the memory is used, and the correction terminal 148 is not used.

Therefore, the correction terminal 148 has a shape different from that of the external terminal 147 so that the correction terminal 148 does not interfere with the connection between the external terminal 147 and another external device. In this embodiment, the correction terminal 148 has a shorter shape than the external terminal 147, so that even when a connection terminal of an external device connected to the external terminal 147 is inserted into the connector 112, the connection is not hindered.

Figure 2G:
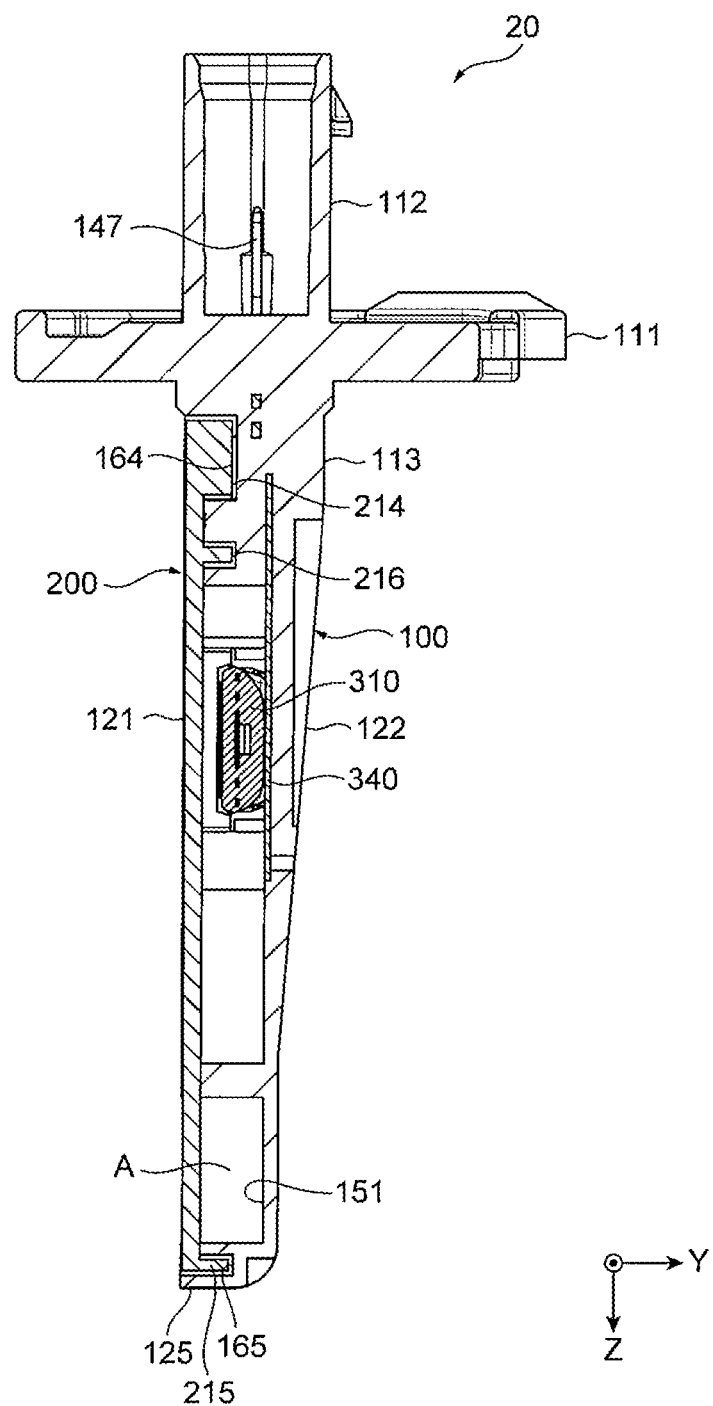
FIG. 2G is a cross-sectional view taken along line IIG-IIG in FIG. 2A.
Figure 3:
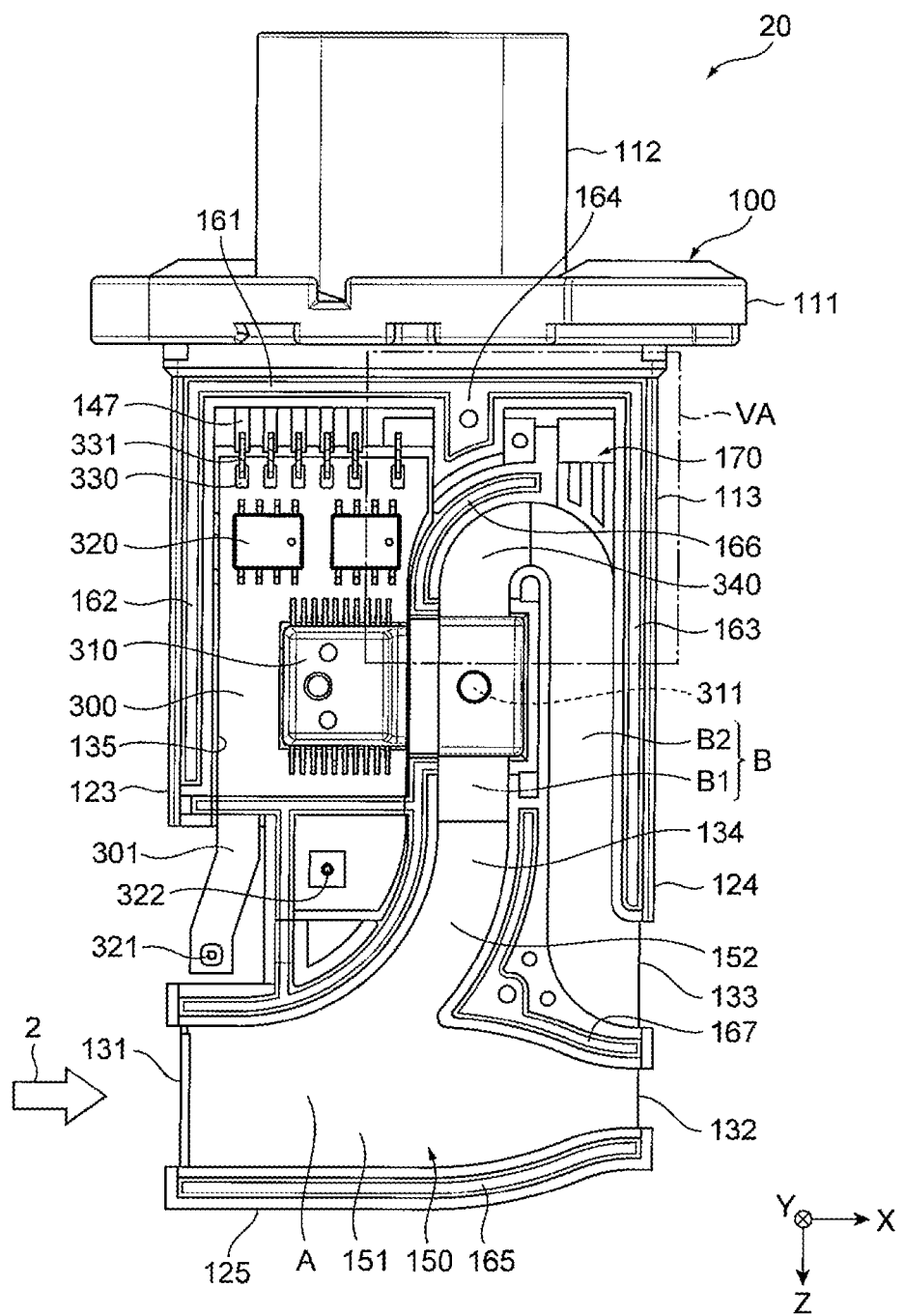
FIG. 3 is a front view of a housing.
Figure 4:
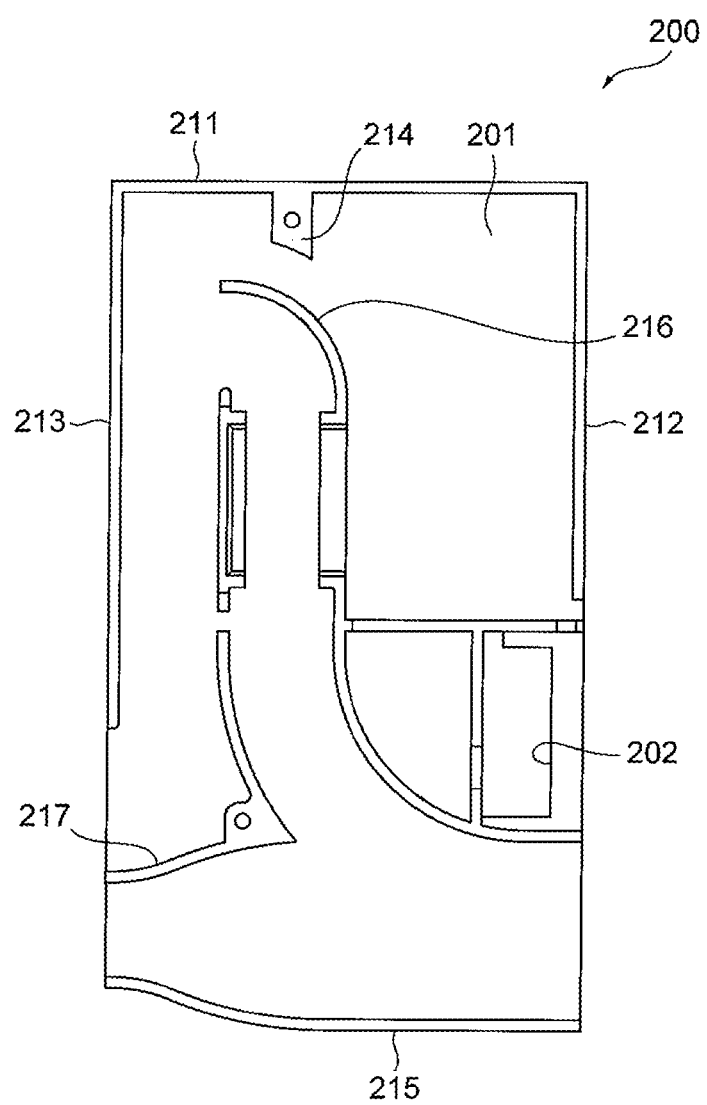
FIG. 4 is a rear view of a cover.

FIG. 2G is a cross-sectional view taken along line IIG-IIG in FIG. 2A, FIG. 2H is a cross-sectional view taken along line IIH-IIH in FIG. 2A, FIG. 3 is a front view of the housing, and FIG. 4 is a rear view of the cover. Note that, in the following description, the longitudinal direction of the measurement unit 113, which is a direction in which the measurement unit 113 extends from the flange 111, may be referred to as a Z-axis, the lateral direction of the measurement unit 113, which is a direction extending from the sub-passage inlet 131 of the measurement unit 113 toward the first outlet 132, may be referred to as an X-axis, and the thickness direction of the measurement unit 113, which is a direction from the front surface 121 toward the back surface 122 of the measurement unit 113, may be referred to as a Y-axis.

The housing 100 is provided with a sub-passage groove 150 for forming a sub-passage 134 and a circuit chamber 135 for accommodating a circuit board 300. The circuit chamber 135 and the sub-passage groove 150 are recessed in front of the measurement unit 113. The circuit chamber 135 is provided in a region on one side (side surface 123 side) in the X-axis direction which is a position on the upstream side in the flow direction of the measurement target gas 2 in the main passage 22. The sub-passage groove 150 is provided over a region on the distal end side in the Z-axis direction (lower surface 125 side) of the measurement unit 113 with respect to the circuit chamber 135, and a region on the other side in the X-axis direction (side surface 124 side) which is a position on the downstream side in the flow direction of the measurement target gas 2 in the main passage 22 with respect to the circuit chamber 135.

The sub-passage groove 150 is covered by the cover 200 to form the sub-passage 134. The sub-passage groove 150 includes a first sub-passage groove 151 and a second sub-passage groove 152 branching in the middle of the first sub-passage groove 151. The first sub-passage groove 151 is formed to extend along the X-axis direction of the measurement unit 113 between the sub-passage inlet 131 opened to the side surface 123 on one side of the measurement unit 113 and the first outlet 132 opened to the side surface 124 on the other side of the measurement unit 113. The first sub-passage groove 151 forms, in cooperation with the cover 200, a first sub-passage A that takes in the measurement target gas 2 flowing in the main passage 22 from the sub-passage inlet 131 and returns the taken measurement target gas 2 from the first outlet 132 to the main passage 22. The first sub-passage A has a flow path extending from the sub-passage inlet 131 along the flow direction of the measurement target gas 2 in the main passage 22 and connected to the first outlet 132.

The second sub-passage groove 152 branches at an intermediate position of the first sub-passage groove 151 and is bent toward the proximal end side (flange side) of the measurement unit 113, and extends along the Z-axis direction of the measurement unit 113. Then, the proximal end portion of the measurement unit 113 is bent toward the other side (side surface 124 side) in the X-axis direction of the measurement unit 113, turns around toward the distal end portion of the measurement unit 113, and extends again along the Z-axis direction of the measurement unit 113. The first outlet 132 is bent toward the other side (side surface 124 side) in the X-axis direction of the measurement unit 113 in front of the first outlet, and is provided so as to be continuous with the second outlet 133 opened to the side surface 124 of the measurement unit 113. The second outlet 133 is arranged to face the main passage 22 toward the downstream side in the flow direction of the measurement target gas 2. The second outlet 133 has an opening area substantially equal to or slightly larger than that of the first outlet 132, and is formed at a position adjacent to the measurement unit 113 on the proximal end side in the longitudinal direction from the first outlet 132.

The second sub-passage groove 152 forms, in cooperation with the cover 200, a second sub-passage B through which the flowing-in measurement target gas 2 branched from the first sub-passage A passes and which is returned from the second outlet 133 to the main passage 22. The second sub-passage B has a flow path that reciprocates along the Z-axis direction of the measurement unit 113. That is, the second sub-passage B has a forward passage portion B1 that branches off in the middle of the first sub-passage A and extends toward the proximal end side of the measurement unit 113 (direction away from the first sub-passage A), and a return passage portion B2 that is folded back and turned around on the proximal end side of the measurement unit 113 (end portion of the separation passage portion) and extends toward the distal end side of the measurement unit 113 (direction approaching the first sub-passage A). The return passage portion B2 is connected to the second outlet 133 that opens toward the downstream side in the flow direction of the measurement target gas 2 at a position on the downstream side in the flow direction of the measurement target gas 2 in the main passage 22 with respect to the sub-passage inlet 131.

In the second sub-passage B, a flow rate sensor (flow rate detection unit) 311 is arranged at an intermediate position of the forward passage portion B1. Since the second sub-passage B is formed so as to extend along the longitudinal direction of the measurement unit 113 and reciprocate, the passage length can be secured longer, and the influence on the flow rate sensor 311 can be reduced when pulsation occurs in the main passage.

The flow rate sensor 311 is provided in a chip package 310. The chip package has a configuration in which the flow rate sensor 311 and an LSI are molded with resin. In the chip package 310, the proximal end portion of the package body is fixed to the circuit board 300 in the circuit chamber 135, the distal end portion is arranged to protrude in the second sub-passage groove 152, and the flow rate sensor 311 is provided at the distal end portion. The flow rate sensor 311 is supported by the chip package 310 so as to be exposed to the forward passage portion B1 of the second sub-passage B. The flow rate sensor 311 is arranged to face a groove bottom surface 152a of the second sub-passage groove 152 with a predetermined interval, and measures the flow rate of the measurement target gas passing through the second sub-passage B.

Circuit components such as a chip package 310, a pressure sensor 320, an intake air temperature sensor 321, and a humidity sensor 322 are mounted on the circuit board 300. In the circuit chamber 135, an end portion of the external terminal 147 is provided to protrude, and is connected to a bonding pad 300 of the circuit board 300 via a bonding wire 331.

The housing 100 is provided with a neutralization plate 340 for neutralizing the measurement target gas passing through the second sub-passage B. The neutralization plate 340 is provided to be exposed to the second sub-passage groove 152 so as to form a part of the groove bottom surface 152a of the second sub-passage groove 152. In this embodiment, the neutralization plate 340 is provided to extend from a position on the first sub-passage A side, which is on the upstream side of the chip package 310 in the flow direction of the measurement target gas in the forward passage portion B1 of the second sub-passage B to a position on the second outlet 133 side, which is on the downstream side of the chip package 310 in the flow direction of the measurement target gas, through a position facing the flow rate sensor 311 of the chip package 310.

The neutralization plate 340 has a connection end portion 341 (see FIG. 5A), is electrically connected to the ground of the circuit board 300 by the bonding wire 331, and neutralizes the measurement target gas passing through the second sub-passage B. Therefore, it is possible to prevent foreign matter contained in the measurement target gas from adhering to the chip package 310 or the flow rate sensor 311 due to charging.

The cover 200 is attached to the front surface 121 of the housing 100 and has a flat plate shape covering the circuit chamber 135 and the sub-passage groove 150 of the measurement unit 113. As illustrated in FIG. 4, the cover 200 is provided with ribs 211 to 217 on the back surface 201. The ribs 211 to 217 are formed along a bonded portion with the measurement unit 113. As illustrated in FIG. 3, the measurement unit 113 is provided with recessed grooves 261 to 268 on the front surface 121, and ribs 271 to 278 are inserted. The cover 200 is bonded with an adhesive in a state where the ribs 271 to 278 are inserted into the recessed grooves 261 to 268 of the measurement unit 113.

Next, a structure for detecting the pressure of the measurement target gas, which is one of the features of the invention, will be described.

Figure 5A:
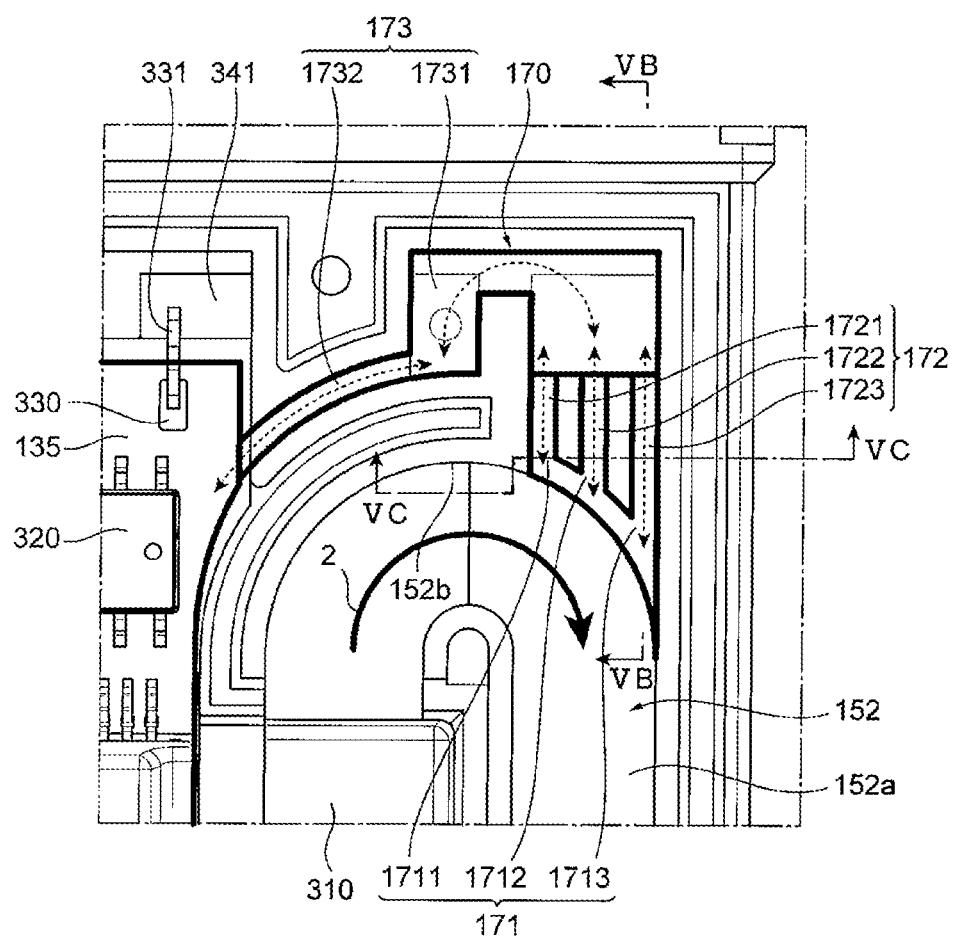
FIG. 5A is an enlarged view illustrating a main part VA of the configuration illustrated in FIG. 3.
Figure 5B:
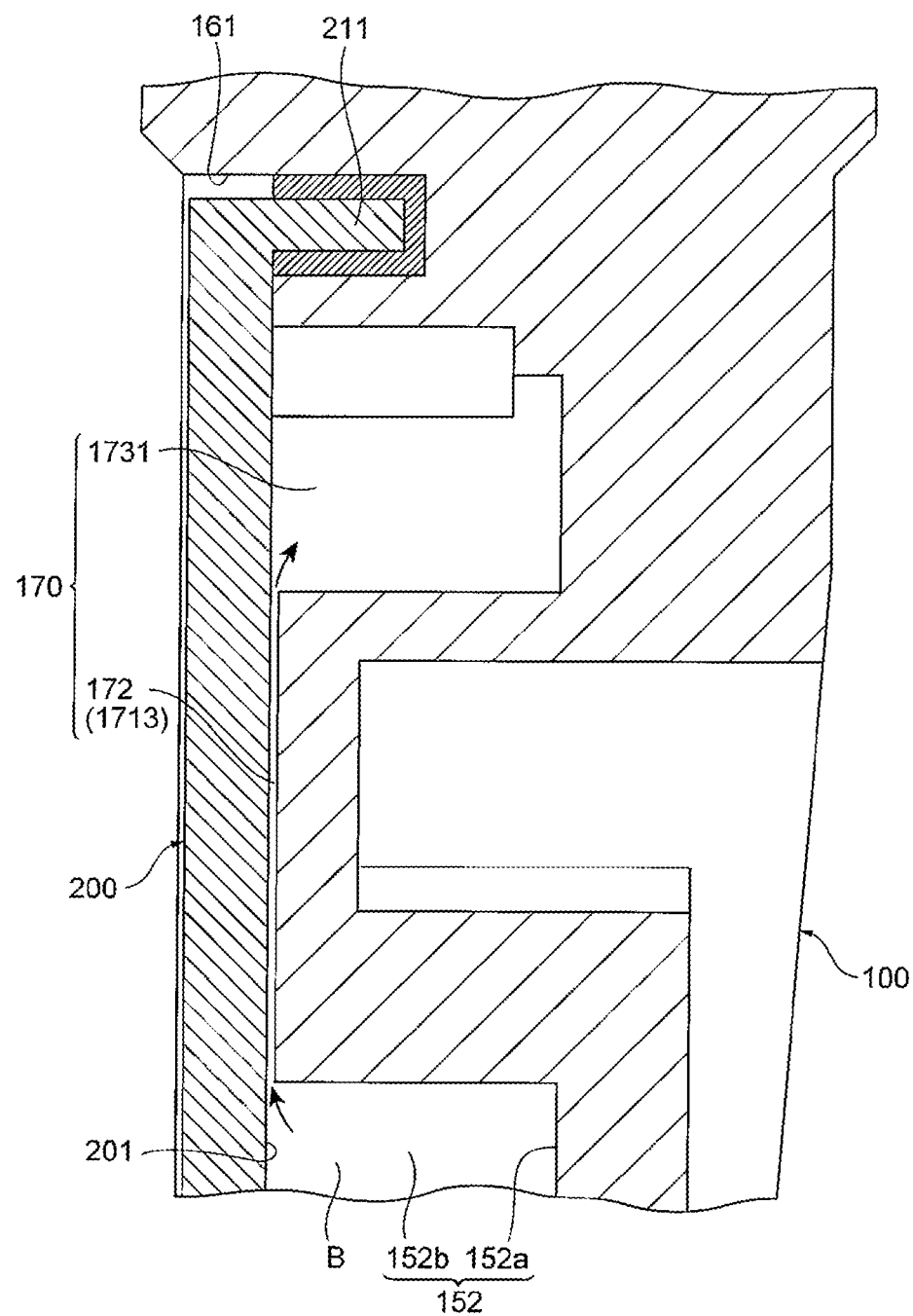
FIG. 5B is a cross-sectional view taken along line VB-VB of FIG. 5A.
Figure 5C:
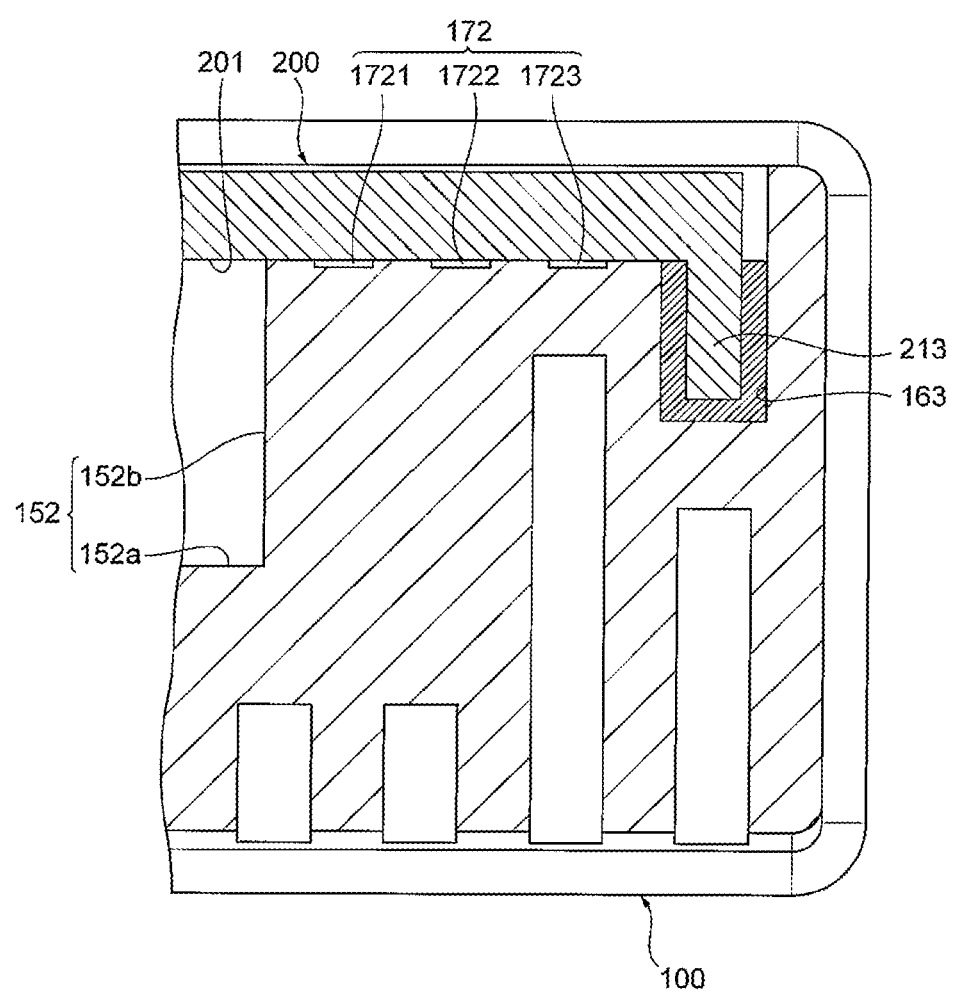
FIG. 5C is a cross-sectional view taken along line VC-VC in FIG. 5A.
Figure 5D:
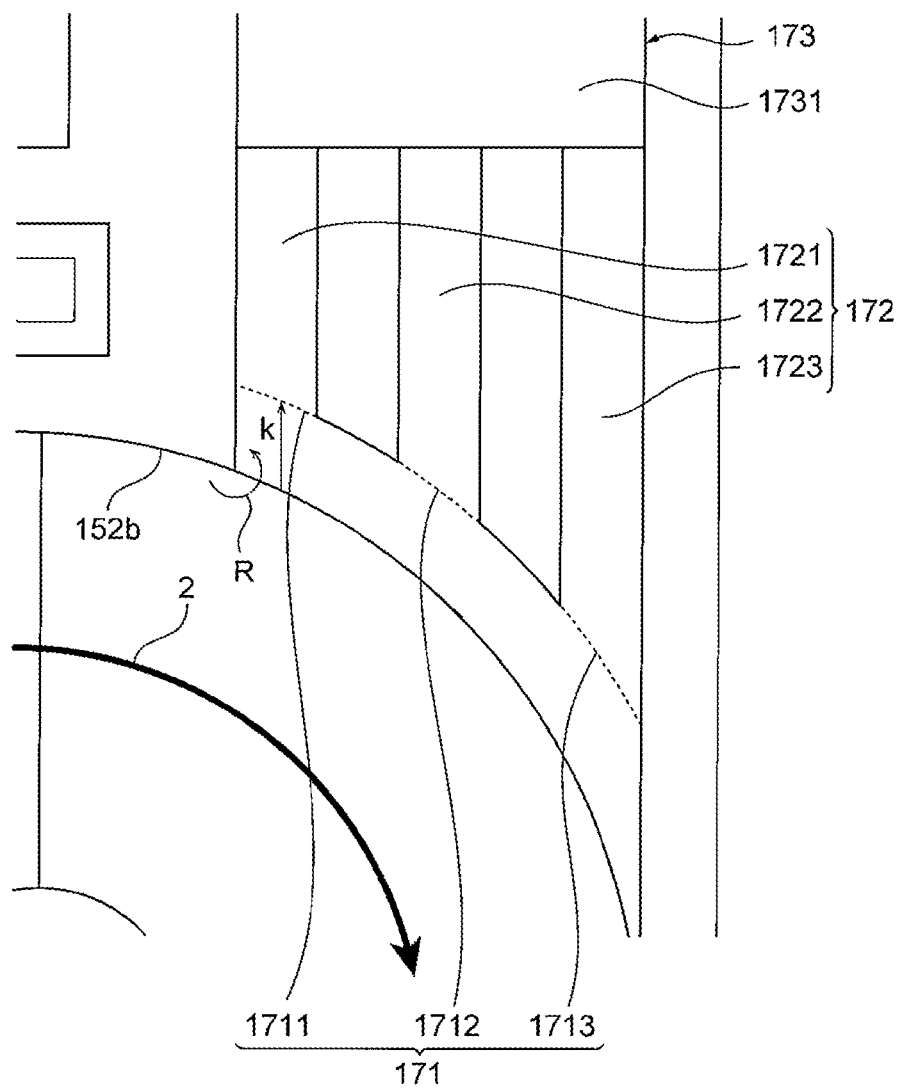
FIG. 5D is an enlarged view of a main part of FIG. 5A.

FIG. 5A is an enlarged view illustrating a main part VA of the configuration illustrated in FIG. 3, FIG. 5B is a cross-sectional view taken along line VB-VB of FIG. 5A, FIG. 5C is a cross-sectional view taken along line VC-VC of FIG. 5A, and FIG. 5D is an enlarged view of the main part of FIG. 5A.

The physical quantity detection device 20 includes the pressure sensor 320 that detects the pressure of the measurement target gas.

The pressure sensor 320 is accommodated in the circuit chamber 135. The pressure sensor 320 is arranged in the circuit chamber 135 in a state of being mounted on the circuit board 300, and in this embodiment, two pressure sensors 320 are arranged side by side. The circuit chamber 135 is connected to the second sub-passage B via a pressure introduction passage 170, and functions as a sensor chamber that introduces the pressure of the measurement target gas in the second sub-passage B and detects the pressure of the measurement target gas by the pressure sensor 320. The circuit chamber 135 is covered by attaching the cover 200, and is sealed such that there is no place communicating with the outside other than the pressure introduction passage 170.

As illustrated in FIG. 5A, the pressure introduction passage 170 has a configuration in which one end is opened in the middle of the passage of the second sub-passage B, the other end is opened to the circuit chamber 135, and the pressure of the measurement target gas can be introduced from the second sub-passage B to the circuit chamber 135. The pressure introduction passage 170 is recessed in a groove shape in the measurement unit 113, and is configured in cooperation with the cover 200. The pressure introduction passage 170 includes an introduction port 171 that opens at a position offset from the passage wall surface of the second sub-passage B, a linear portion 172 having a sled shape and linearly extending from the introduction port 171, and a bent portion 173 having a labyrinth shape and connected to the circuit chamber 135 while being bent a plurality of times continuously with the linear portion 172.

The introduction port 171 is provided at a position on the downstream side of the chip package 310 in the flow direction of the measurement target gas of the second sub-passage B. In this embodiment, the introduction port is provided at a folded portion that is folded back from the forward passage portion B1 to the return passage portion B2 of the second sub-passage B. In the folded portion, the side wall surface 152b on the outer peripheral side of the second sub-passage groove 152 is curved in a semicircular arc shape, and the introduction port 171 is arranged at a bent portion which is a portion curved in a semicircular arc shape of the side wall surface 152b and which is a portion located closer to the return passage portion B2 than the top portion of the folded portion of the return passage portion B2. As illustrated in FIG. 5D, the introduction port 171 is provided at a position offset outward from the curved portion of the side wall surface 152b by a predetermined distance k. The predetermined distance k is set in such a manner that a distance at which a separation flow R in which the measurement target gas passing through the return passage portion B2 is separated from the side wall surface 152b can be generated between the side wall surface 152b and the introduction port 171 is obtained in advance by an experiment or a simulation.

A plurality of the introduction ports 171 is provided at predetermined intervals in the flow direction of the measurement target gas of the second sub-passage B. In this embodiment, three ports of a first introduction port 1711, a second introduction port 1712, and a third introduction port 1713 are provided. The linear portion 172 of the pressure introduction passage 170 includes a first passage portion 1721, a second passage portion 1722, and a third passage portion 1723 extending in parallel with each other from the first introduction port 1711, the second introduction port 1712, and the third introduction port 1713.

The first introduction port 1711, the second introduction port 1712, the third introduction port 1713, the first passage portion 1721, the second passage portion 1722, and the third passage portion 1723 have a shallow groove shape (sled shape) recessed in the surface of the measurement unit 113 abutting on the cover 200, and each have a groove depth h. As illustrated in FIGS. 5B and 5C, the groove depth h is formed extremely shallower than the groove depth of the second sub-passage groove 152. In this embodiment, the first passage portion 1721, the second passage portion 1722, and the third passage portion 1723 have dimensional shapes with a width W of 1.0 mm and a depth h of 0.1 mm.

As shown in FIG. 5D, the first introduction port 1711 is provided at a position recessed to the outside of the curve from the side wall surface 152b via a step having a predetermined distance k with respect to the side wall surface 152b. The first passage portion 1721 continuous with the first introduction port 1711 is provided so as to extend along a direction in which an angle with the flow direction of the measurement target gas 2 flowing through the second sub-passage B is 90 degrees or less. Therefore, the measurement target gas 2 flowing along the side wall surface 152b is prevented from linearly flowing into the first passage portion 1721 from the first introduction port 1711, and a strong separation flow R can be generated by the step portion between the side wall surface 152b and the first introduction port 1711.

As illustrated in FIG. 5A, the bent portion 173 of the pressure introduction passage 170 includes a substantially U-shaped chamber portion 1731 connected to each of the first passage portion 1721, the second passage portion 1722, and the third passage portion 1723, and a curved portion 1732 curved and extending in an arc shape from the chamber portion 1731 to the circuit chamber 135. As illustrated in FIG. 5A, the chamber portion 1731 has an inverted U shape such that the flow direction in which the measurement target gas passing through the first passage portion 1721, the second passage portion 1722, the third passage portion 1723, or the curved portion 1732 flows is converted by 180 degrees, and has a labyrinth-like structure in which the opening of the circuit chamber 135 and the introduction port 171 of the pressure introduction passage 170 are not linearly connected. As shown in FIG. 5B, the chamber portion 1731 has substantially the same depth as the groove bottom surface 152a of the second sub-passage groove 152, forms a predetermined indoor space, and can temporarily store water entering from the second sub-passage B.

The curved portion 1732 has a groove shape recessed in the surface of the measurement unit 113 in contact with the cover 200, and the groove depth is set to the same depth h as the first passage portion 1721, the second passage portion 1722, and the third passage portion 1723. The curved portion 1732 has an arc shape extending along the outside of the folded portion of the second sub-passage B.

Since the pressure introduction passage 170 described above is provided with the first introduction port 1711 at a position offset to the outer side of the curve by the predetermined distance k from the side wall surface 152b of the second sub-passage groove 152, the separation flow R in which the measurement target gas 2 passing through the second sub-passage B is separated from the side wall surface 152b can be generated in front of the first introduction port 1711 between the side wall surface 152b and the first introduction port 1711. Therefore, a negative pressure environment due to the separation flow R can be formed in front of the first introduction port 1711, the influence of the dynamic pressure of the measurement target gas with respect to the first introduction port 1711 can be reduced, and the air accompanied by the foreign matter can be reduced from flowing into the first introduction port 1711 from the second sub-passage B. Therefore, it is possible to prevent foreign matter from entering the pressure introduction passage 170 and the circuit chamber 135 and to stably measure the pressure by ensuring ventilation.

In particular, in this embodiment, since the first introduction port 1711 is arranged on the outer side wall surface 152b curved in a semicircular arc shape of the second sub-passage groove 152 and at the bent portion folded back toward the return passage portion B2 side, a stronger separation flow R can be generated. Therefore, the influence of the separation flow R can be made more apparent, and the first introduction port 1711 can be made less susceptible to the influence of the dynamic pressure.

Further, according to the configuration of the pressure introduction passage 170 described above, since the introduction port 171 is provided at the position on the downstream side of the chip package 310 in the flow direction of the measurement target gas of the second sub-passage B, it is possible to prevent the static characteristics of the flow rate sensor 311 from being affected. Therefore, the detection accuracy of the flow rate sensor 311 can be further improved.

The pressure introduction passage 170 has a slid-shaped linear portion 172 linearly extending from the introduction port 171 and a labyrinth-shaped bent portion 183 connected to the circuit chamber 135 while being bent a plurality of times continuously to the linear portion 172, and has a structure in which the opening of the circuit chamber 135 and the introduction port 171 of the pressure introduction passage 170 are not linearly connected. Therefore, it is difficult for the foreign matter contained in the measurement target gas to enter and pass through the pressure introduction passage 170, and it is possible to effectively prevent the foreign matter from entering the circuit chamber 135.

Figure 5E:
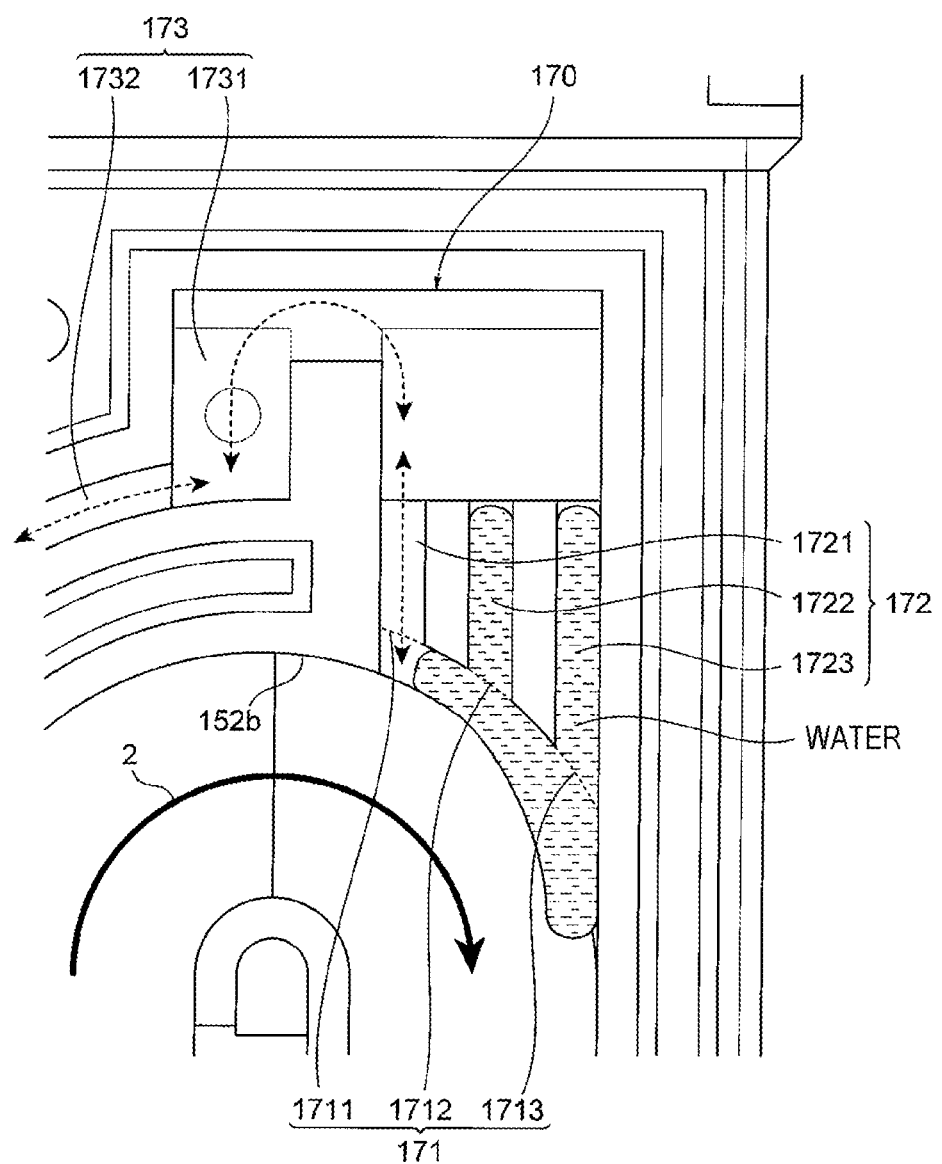
FIG. 5E is a diagram for explaining an action of an introduction port.

FIG. 5E is a diagram for explaining the action of the introduction port, and is a view schematically illustrating a state in which water has entered the second sub-passage B.

For example, as shown in FIG. 5E, when water enters the second sub-passage B, in the first introduction port 1711, the negative pressure environment due to the separation flow R is formed in front of the first introduction port 1711, and the influence of the dynamic pressure toward the first introduction port 1711 is reduced. Therefore, it is possible to prevent water from entering the first passage portion 1721 from the first introduction port 1711, and it is possible to always secure ventilation. Therefore, the pressure can be stably measured.

Since the second introduction port 1712 and the third introduction port 1713 are less affected by the separation flow R than the first introduction port 1711 and receive the dynamic pressure of the measurement target gas, there is a possibility that water enters the second passage portion 1722 and the third passage portion 1723 from the second introduction port 1712 and the third introduction port 1713, respectively. However, since the bent portion 173 having the chamber portion 1731 and the curved portion 1732 is continuously provided in the second passage portion 1722 and the third passage portion 1723, it is possible to prevent water from entering the circuit chamber 135.

Figure 6A:
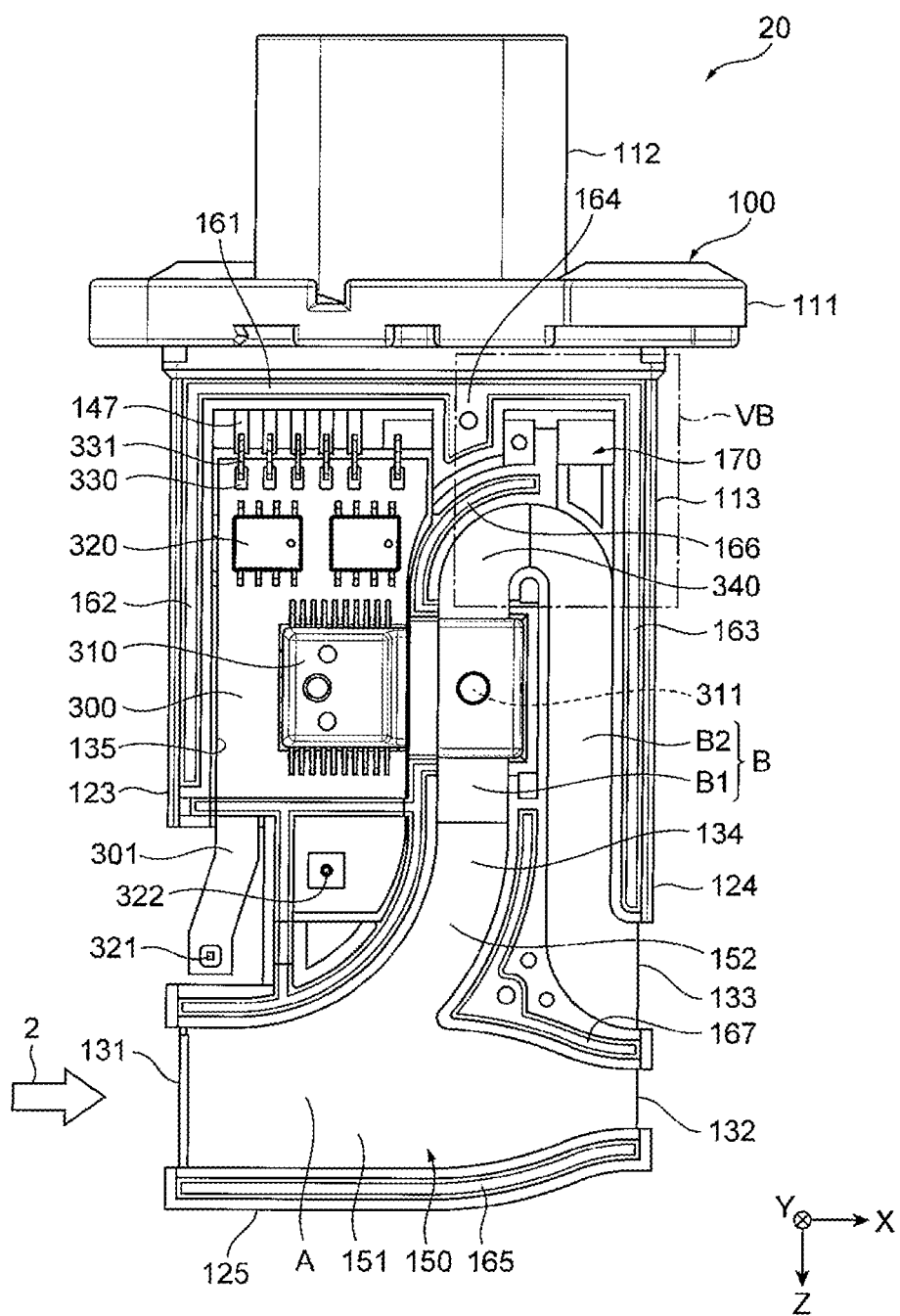
FIG. 6A is a diagram for explaining a first modification of a first embodiment.
Figure 6B:
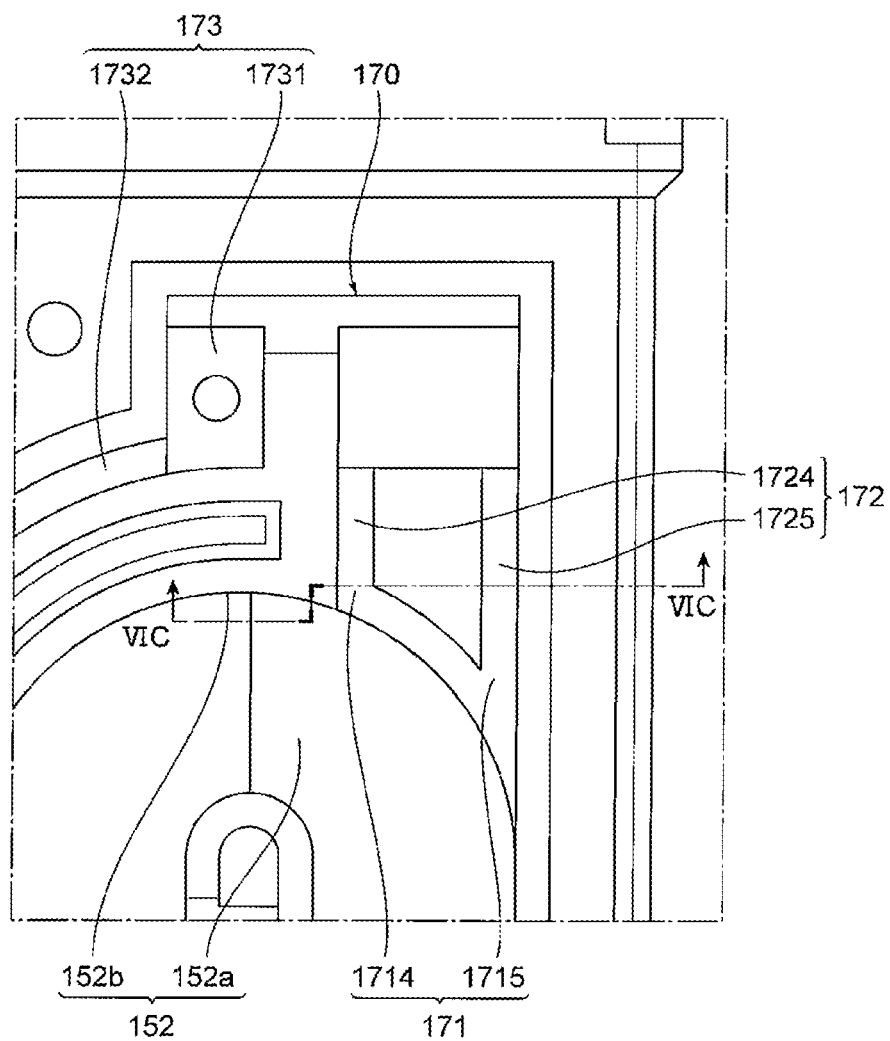
FIG. 6B is an enlarged view illustrating a main part VB of the configuration illustrated in FIG. 6A.
Figure 6C:
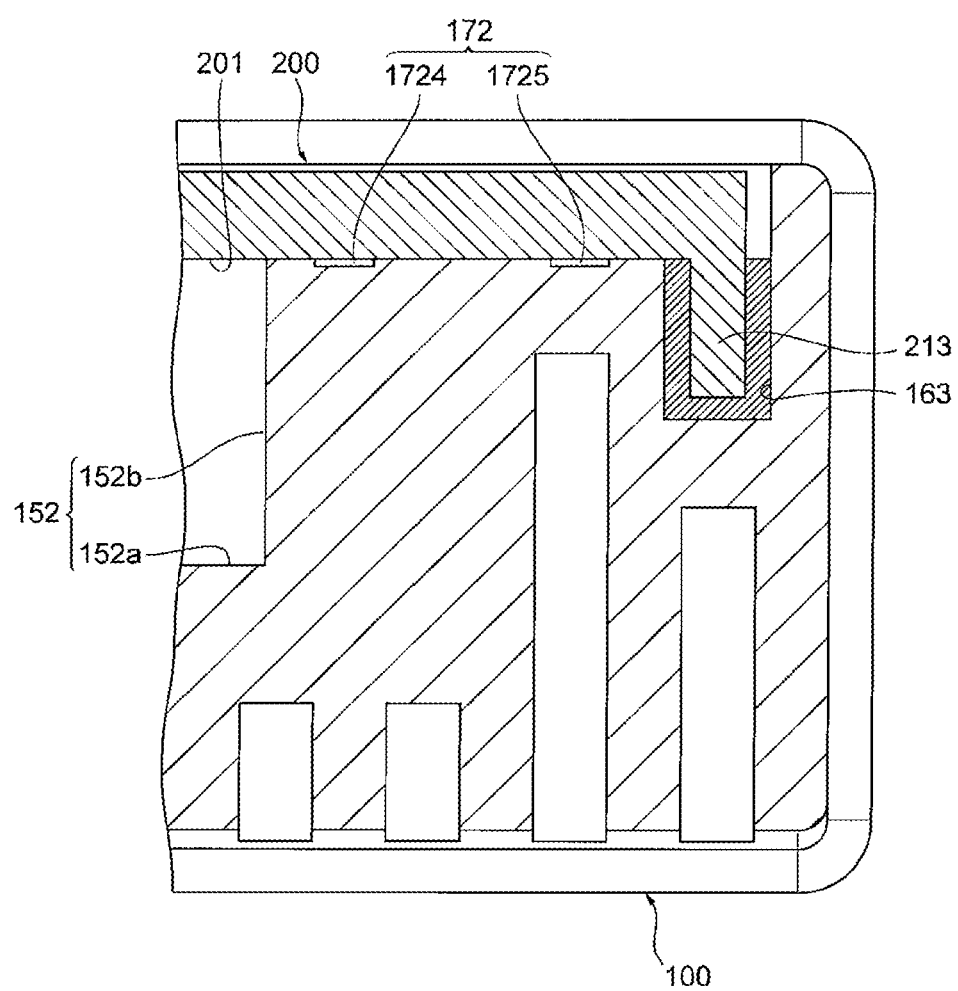
FIG. 6C is a cross-sectional view taken along line VIC-VIC in FIG. 6B.
Figure 7A:
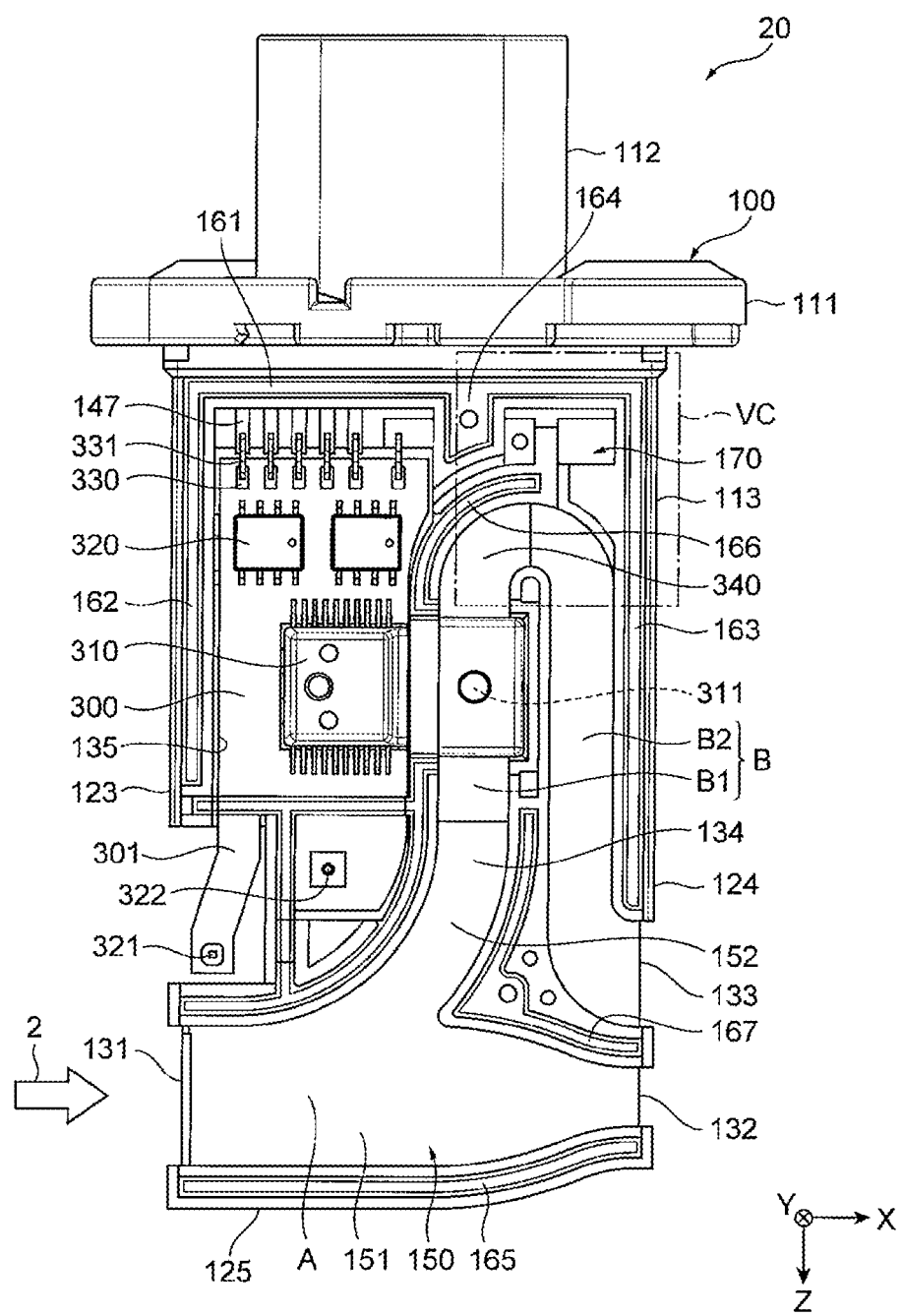
FIG. 7A is a diagram for explaining a second modification of the first embodiment.
Figure 7B:
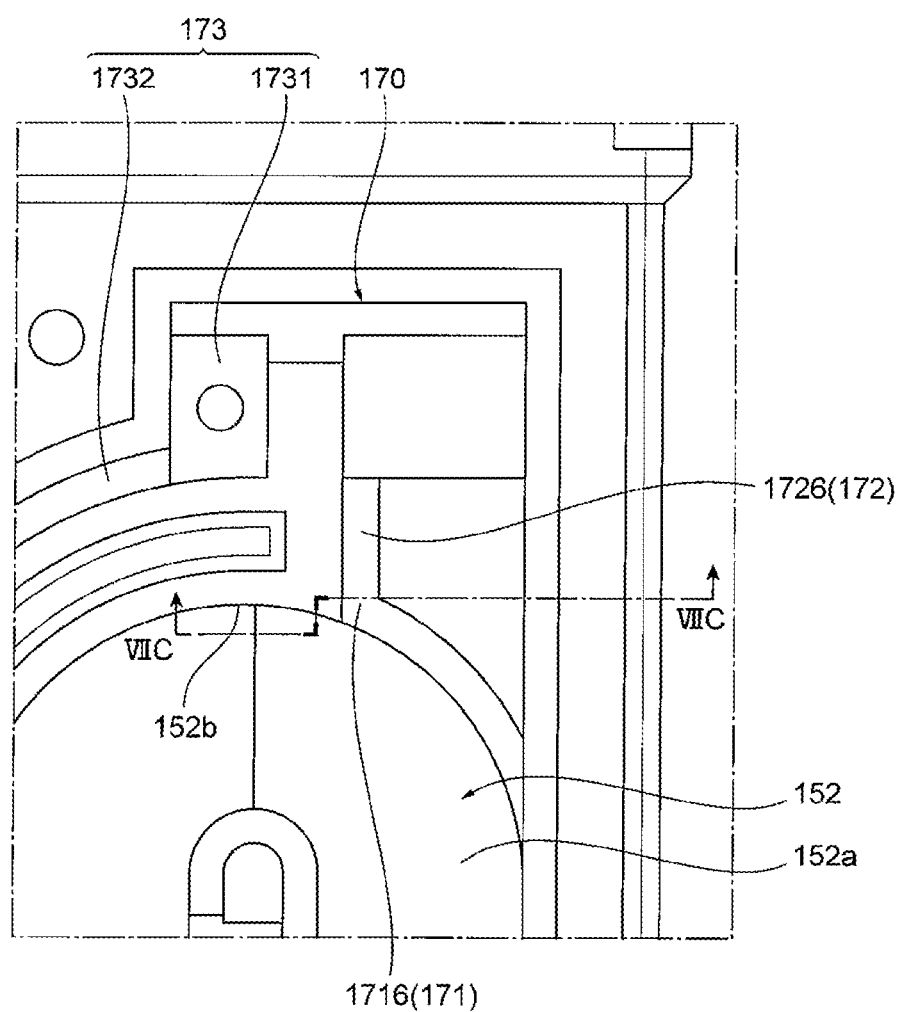
FIG. 7B is an enlarged view illustrating a main part VC of the configuration illustrated in FIG. 7A.
Figure 7C:
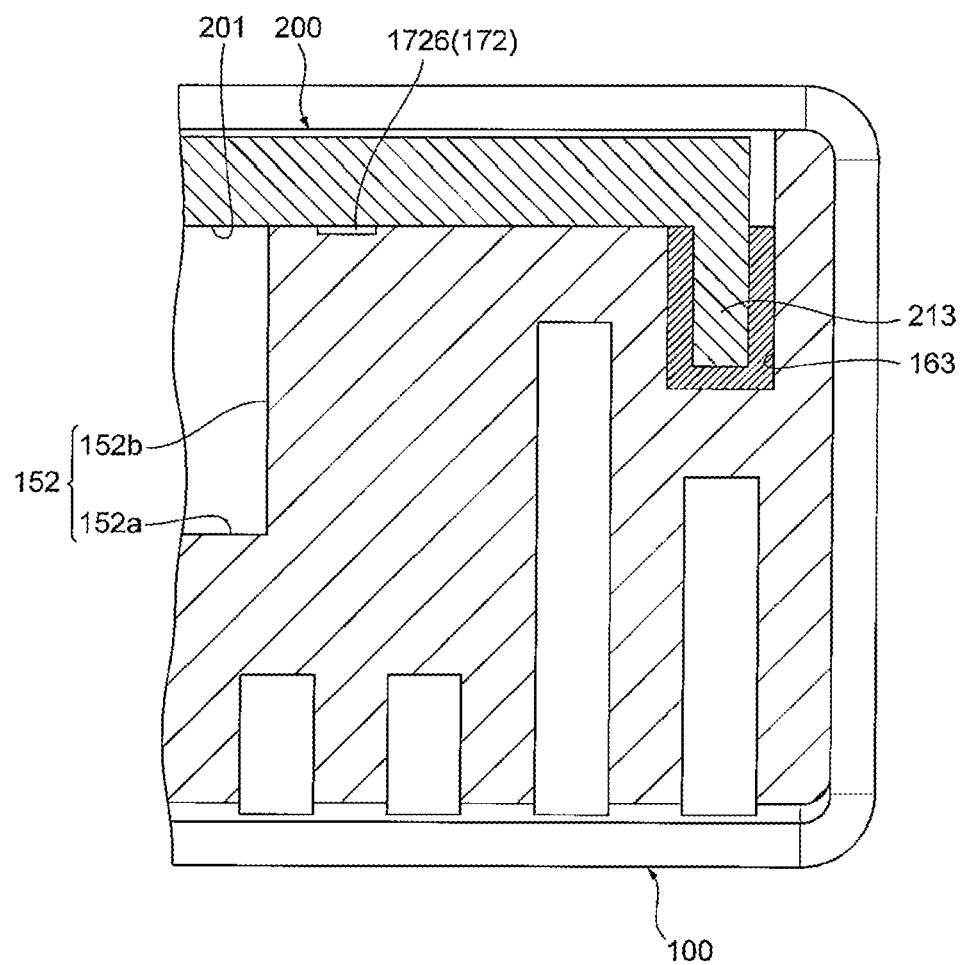
FIG. 7C is a cross-sectional view taken along line VIIC-VIIC of FIG. 7B.

Next, a modification of the first embodiment will be described. FIGS. 6A to 6C are diagrams for explaining a first modification of the first embodiment, and FIGS. 7A to 7C are diagrams for explaining a second modification of the first embodiment.

Note that components similar to those in the above-described embodiment are denoted by the same reference numerals, and a detailed description thereof will be omitted.

FIG. 6A is a front view of a housing of a physical quantity detection device according to the first modification, FIG. 6B is an enlarged view illustrating a main part of the configuration illustrated in FIG. 6A, and FIG. 6C is a cross-sectional view taken along line VIC-VIC of FIG. 6B.

In the above-described embodiment illustrated in FIG. 5A, the case where three introduction ports, that is, the first introduction port 1711, the second introduction port 1712, and the third introduction port 1713 are provided has been described as an example, but the invention is not limited to this configuration. Any configuration may be adopted as long as a negative pressure environment due to the separation flow can be formed in front of the introduction port 171, the influence of the dynamic pressure of the measurement target gas on the introduction port 171 can be reduced, and the air accompanied by the foreign matter can be reduced from flowing into the introduction port 171 from the second sub-passage B, and the number of the introduction ports may be one or more.

As shown in FIGS. 6A to 6B, the first modification includes two introduction ports, that is, a first introduction port 1714 and a second introduction port 1715. The first introduction port 1714 and the second introduction port 1715 are arranged apart from each other at positions on the bending start side and the bending end side of the bent portion. The first introduction port 1714 and the second introduction port 1715 are arranged at positions offset outward of the curve by a predetermined distance k from the side wall surface 152*b* of the second sub-passage groove 152. The first introduction port 1714 and the second introduction port 1715 are continuously provided with a linear first passage portion 1724 and a linear second passage portion 1725, respectively.

In the pressure introduction passage 170 of the first modification, as in the above-described embodiment, the first introduction port 1714 is provided at a position offset to the outer side of the curve by the predetermined distance k from the side wall surface 152*b* of the second sub-passage groove 152. Therefore, a separation flow in which the measurement target gas passing through the second sub-passage B is separated from the side wall surface 152*b* can be generated in front of the first introduction port 1714 between the side wall surface 152*b* and the first introduction port 1714. A negative pressure environment due to the separation flow can be formed in front of the first introduction port 1714, the influence of the dynamic pressure of the measurement target gas with respect to the first introduction port 1714 can be reduced, and the air accompanied by the foreign matter can be reduced from flowing into the first introduction port 1714 from the second sub-passage B. Therefore, it is possible to prevent foreign matter from entering the pressure introduction passage 170 and the circuit chamber 135 and to stably measure the pressure by ensuring ventilation.

As shown in FIGS. 7A to 7B, a second modification includes one introduction port 171 called a first introduction port 1716. The first introduction port 1716 is arranged at a position on the bending start side of the bent portion. The first introduction port 1716 is arranged at a position offset to the outer side of the curve by a predetermined distance k from the side wall surface 152*b* of the second sub-passage groove 152. A linear first passage portion 1726 is continuously provided in the first introduction port 1716.

In the pressure introduction passage 170 of the second modification, as in the above-described embodiment, the first introduction port 1716 is provided at a position offset to the outer side of the curve by the predetermined distance k from the side wall surface 152*b* of the second sub-passage groove 152. Therefore, a separation flow in which the measurement target gas passing through the second sub-passage B is separated from the side wall surface 152*b* can be generated in front of the first introduction port 1716 between the side wall surface 152*b* and the first introduction port 1716. Therefore, a negative pressure environment due to the separation flow can be formed in front of the first introduction port 1716, the influence of the dynamic pressure of the measurement target gas with respect to the first introduction port 1716 can be reduced, and the air accompanied by the foreign matter can be reduced from flowing into the first introduction port 1716 from the second sub-passage B. Therefore, it is possible to prevent foreign matter from entering the pressure introduction passage 170 and the circuit chamber 135 and to stably measure the pressure by ensuring ventilation.

Second Embodiment

Figure 8A:
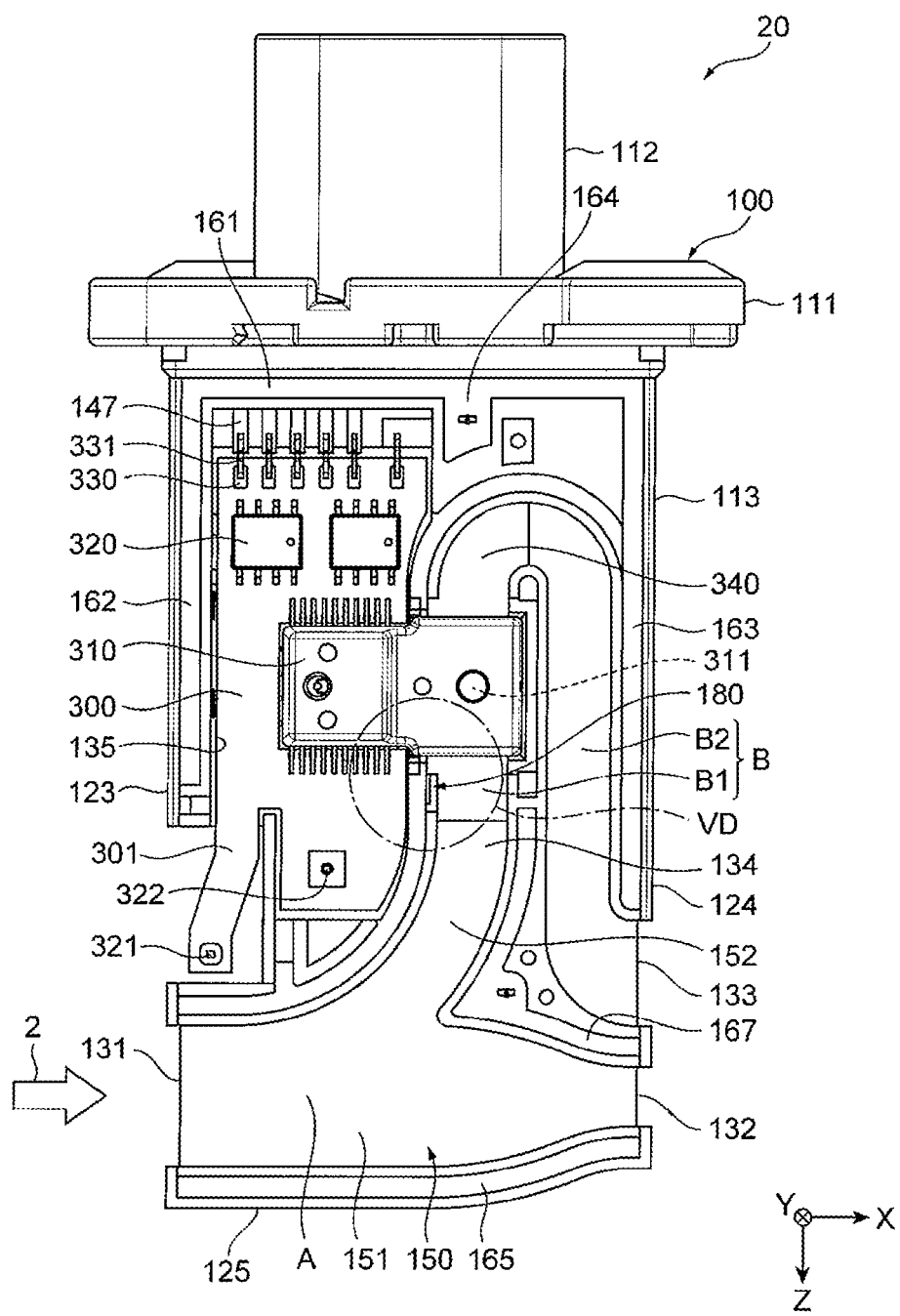
FIG. 8A is a front view of a housing of a physical quantity detection device according to a second embodiment.
Figure 8B:
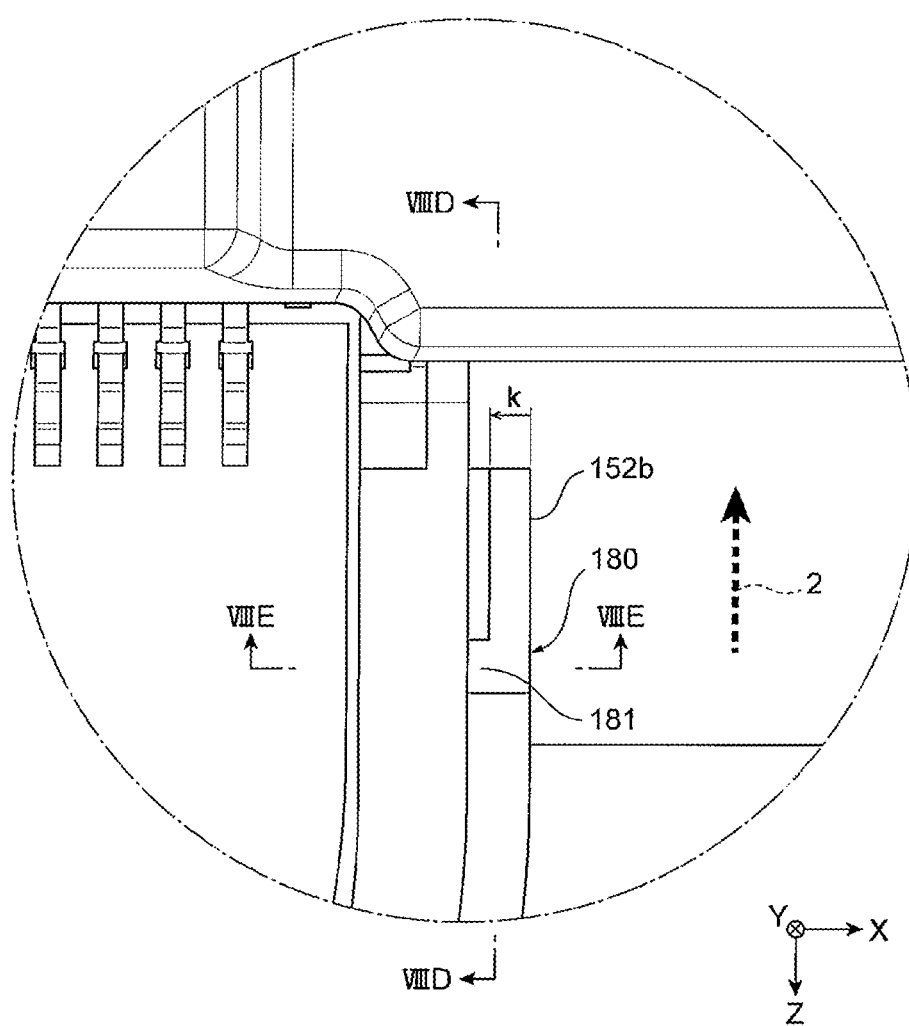
FIG. 8B is an enlarged view illustrating a main part VD of the configuration illustrated in FIG. 8A.
Figure 8C:
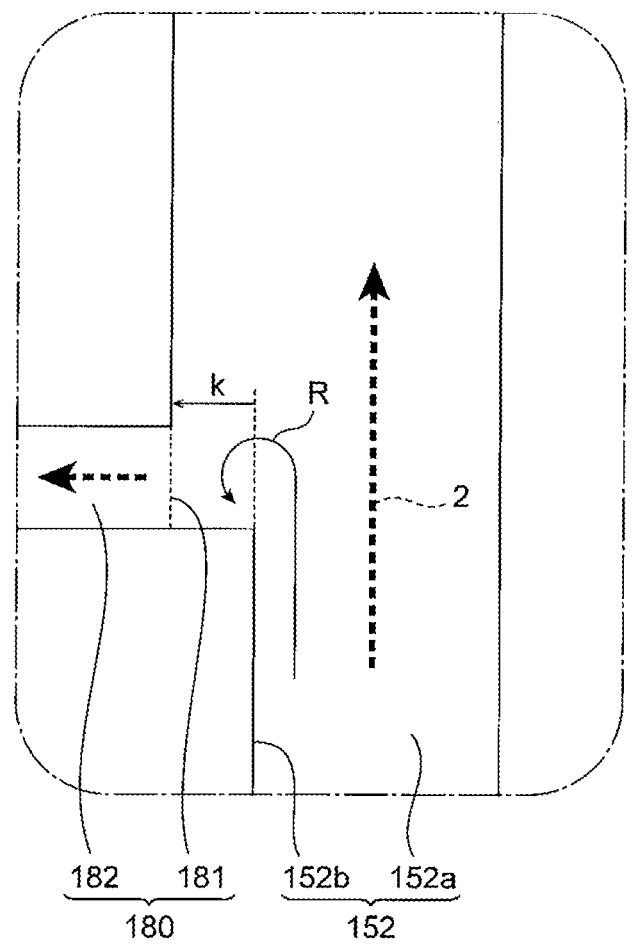
FIG. 8C is a diagram for explaining the action of the pressure introduction port.
Figure 8D:
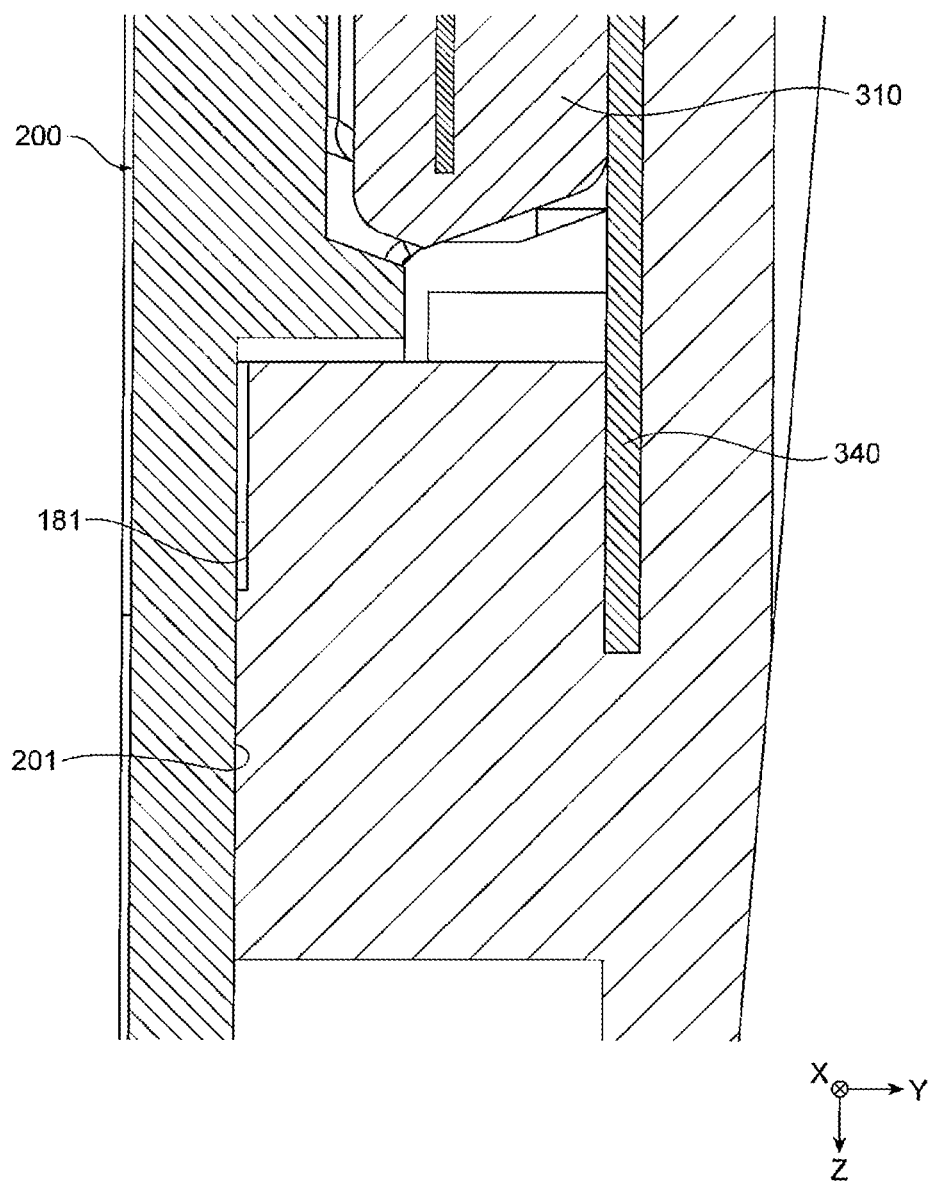
FIG. 8D is a cross-sectional view taken along line VIIID-VIIID in FIG. 8B.
Figure 8E:
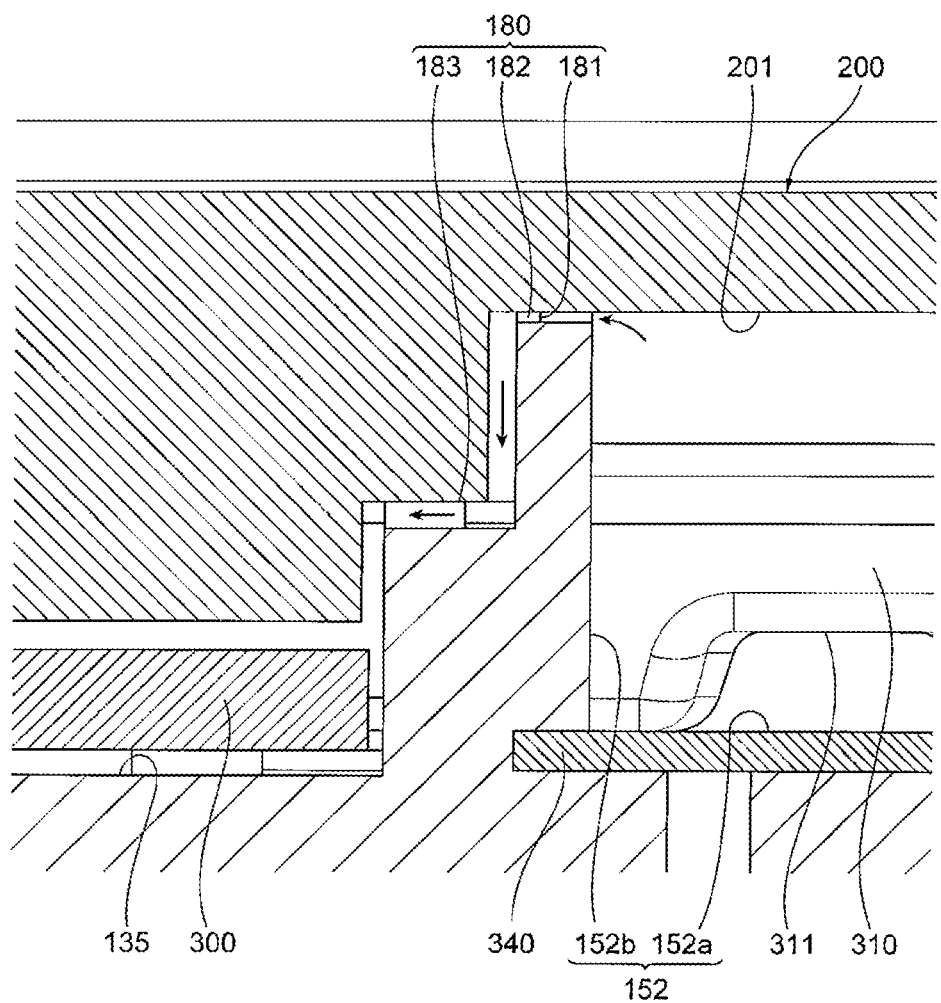
FIG. 8E is a cross-sectional view taken along line VIIIE-VIIIE in FIG. 8B.

Next, the physical quantity detection device 20 according to a second embodiment of the invention will be described. FIG. 8A is a front view of the housing of the physical quantity detection device according to the second embodiment, FIG. 8B is an enlarged view illustrating a main part VD of the configuration illustrated in FIG. 8A, FIG. 8C is a diagram for explaining the action of the pressure introduction port, FIG. 8D is a cross-sectional view taken along line VIIID-VIIID of FIG. 8B, and FIG. 8E is a cross-sectional view taken along line VIIIE-VIIIE of FIG. 8B. The same components as those of the first embodiment are denoted by the same reference numerals, and detailed description thereof will be omitted.

A characteristic feature of this embodiment is that the pressure introduction passage 180 is provided at a position on the upstream side of the second sub-passage B with respect to the chip package 310 and at a linear portion of the second sub-passage B.

As illustrated in FIGS. 8A to 8D, the pressure introduction passage 180 has a configuration in which one end is opened in the middle of the passage of the second sub-passage B, the other end is opened to the circuit chamber 135, and the pressure of the measurement target gas can be introduced from the second sub-passage B to the circuit chamber 135. The pressure introduction passage 180 is recessed in a groove shape in the measurement unit 113, and is configured in cooperation with the cover 200. The pressure introduction passage 180 includes an introduction port 181 that opens at a position offset from the passage wall surface of the second sub-passage B, a linear portion 182 that extends linearly from the introduction port 181, and a bent portion 183 that is connected to the circuit chamber 135 in a labyrinth shape while being bent a plurality of times continuously with the linear portion 182.

As illustrated in FIG. 8A, the introduction port 181 is provided at a position on the upstream side of the chip package 310 in the flow direction of the measurement target gas of the second sub-passage B and at a linear portion of the forward passage portion B1 of the second sub-passage B. The side wall surface 152*b* of the second sub-passage groove 152 has a linear portion extending linearly from the chip package 310 toward the first sub-passage groove 151, and the introduction port 181 is arranged in the linear portion. As illustrated in FIGS. 8B and 8C, the introduction port 181 is provided at a position offset outward in the groove width direction of the second sub-passage groove 152 by a predetermined distance k from the linear portion of the side wall surface 152*b*. The predetermined distance k is set by preliminarily determining, by an experiment or a simulation, a distance at which the separation flow R in which the measurement target gas 2 passing through the forward passage portion B1 is separated from the side wall surface 152*b* can be generated between the side wall surface 152*b* and the introduction port 181.

The linear portion 182 of the pressure introduction passage 180 has a shape extending from the introduction port 181 toward the outside in the groove width direction of the second sub-passage groove 152. The introduction port 181 and the linear portion 182 have a shallow groove shape (a sled shape) recessed in the surface of the measurement unit 113 in contact with the cover 200, and each have a groove depth h. As illustrated in FIGS. 8D and 8E, the groove depth h is formed extremely shallower than the groove depth of the second sub-passage groove 152. In this embodiment, the linear portion 182 has a dimensional shape having a width W of 1.0 mm and a depth h of 0.1 mm.

As illustrated in FIG. 8C, the introduction port 181 is provided at a position recessed outward in the groove width direction of the second sub-passage groove 152 from the side wall surface 152*b* via a step having a predetermined distance k with respect to the side wall surface 152*b*. The linear portion 182 continuous with the introduction port 181 is provided so as to extend along a direction in which an angle with the flow direction of the measurement target gas 2 flowing through the second sub-passage B is approximately 90 degrees. Therefore, the measurement target gas 2 flowing along the side wall surface 152b is prevented from flowing straight in a straight line from the introduction port 181 toward the linear portion 182, and a strong separation flow R can be generated by the step portion between the side wall surface 152b and the introduction port 181.

As illustrated in FIG. 8E, the bent portion 183 of the pressure introduction passage 180 is formed between a step surface of the housing 100 formed to be deep stepwise from the linear portion 182 and a protrusion of the cover 200 facing the step surface with a predetermined gap therebetween. The bent portion 183 has a crank shape that is bent toward the back surface 122 at the end portion of the linear portion 182 and shifts in the Y-axis direction, and is bent toward the side surface 123 at a predetermined depth position and shifts in the X-axis direction, and has a structure in which the opening of the circuit chamber 135 and the introduction port 181 of the pressure introduction passage 180 are not linearly connected.

Since the pressure introduction passage 180 is provided with the introduction port 181 at a position offset outward in the groove width direction by the predetermined distance k from the side wall surface 152b of the second sub-passage groove 152, as illustrated in FIG. 8C, the separation flow R in which the measurement target gas 2 passing through the second sub-passage B is separated from the side wall surface 152b can be generated in front of the introduction port 181 between the side wall surface 152b and the introduction port 181. Therefore, a negative pressure environment due to the separation flow R can be formed in front of the introduction port 181, the influence of the dynamic pressure of the measurement target gas on the introduction port 181 can be reduced, and the air accompanied by the foreign matter can be reduced from flowing into the introduction port 181 from the second sub-passage B. Therefore, it is possible to prevent foreign matter from entering the pressure introduction passage 180 and the circuit chamber 135 and to stably measure the pressure by ensuring ventilation.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 2 measurement target gas
20 physical quantity detection device
135 circuit chamber (sensor chamber)
170, 180 pressure introduction passage
171, 181 introduction port
172, 182 linear portion
173, 183 bending portion
310 chip package
311 flow rate sensor
320 pressure sensor
B second sub-passage
B1 forward passage portion
B2 return passage portion

The invention claimed is:

1. A physical quantity detection device, comprising
a housing arranged in a main passage through which a measurement target gas flows,
wherein the housing is provided with a sub-passage that takes in a part of the measurement target gas flowing through the main passage, a sensor chamber that accommodates a pressure sensor that detects a pressure of the measurement target gas, and a pressure introduction passage that has one end opened in the middle of the sub-passage and the other end opened in the sensor chamber and is capable of introducing the pressure of the measurement target gas from the sub-passage to the sensor chamber, and
the pressure introduction passage has an introduction port arranged at a position offset outward from a side wall surface of the sub-passage.

2. The physical quantity detection device according to claim 1, wherein
the sub-passage includes a forward passage portion extending toward one side in an axial direction along a predetermined axial direction, and a return passage portion turning around at an end portion of the forward passage portion and extending toward the other side in the axial direction, and
the introduction port is arranged on a side wall surface on an outer peripheral side curved in a semicircular arc shape and at a bent portion located closer to the return passage portion than a top portion of a folded portion in the sub-passage folded back from the forward passage portion to the return passage portion.

3. The physical quantity detection device according to claim 2, wherein
a flow rate sensor that detects a flow rate of the measurement target gas is arranged in the sub-passage, and
the introduction port is provided at a position on a downstream side of the flow sensor in the flow direction of the measurement target gas in the sub-passage.

4. The physical quantity detection device according to claim 3, wherein the flow rate sensor is provided in the forward passage portion of the sub-passage.

5. The physical quantity detection device according to claim 1, wherein a plurality of the introduction ports is provided at predetermined intervals in a flow direction of the measurement target gas in the sub-passage.

6. The physical quantity detection device according to claim 1, wherein the pressure introduction passage has a labyrinth-shaped bent portion.

7. The physical quantity detection device according to claim 1, wherein
the sub-passage includes a passage portion on a straight line extending along a predetermined axial direction,
a flow rate sensor that detects a flow rate of the measurement target gas is arranged in the passage portion, and
the introduction port is provided at a position on an upstream side of the flow sensor in a flow direction of the measurement target gas of the sub-passage.

* * * * *